(12) United States Patent
Leiber et al.

(10) Patent No.: US 12,304,451 B2
(45) Date of Patent: May 20, 2025

(54) BRAKE SYSTEM

(71) Applicant: IPGATE AG, Pfäffikon (CH)

(72) Inventors: Heinz Leiber, Oberriexingen (DE);
Anton Van Zanten, Ditzingen (DE);
Thomas Leiber, Rogoznica (HR)

(73) Assignee: IPGATE AG, Pfäffikon (CH)

( * ) Notice: Subject to any disclaimer, the term of this patent is extended or adjusted under 35 U.S.C. 154(b) by 1071 days.

(21) Appl. No.: 17/053,353

(22) PCT Filed: Aug. 17, 2018

(86) PCT No.: PCT/EP2018/072363
§ 371 (c)(1),
(2) Date: Nov. 5, 2020

(87) PCT Pub. No.: WO2019/214833
PCT Pub. Date: Nov. 14, 2019

(65) Prior Publication Data
US 2021/0229645 A1    Jul. 29, 2021

(30) Foreign Application Priority Data

May 9, 2018   (WO) ................ PCT/EP2018/061995
Jun. 20, 2018  (WO) ................ PCT/EP2018/066436

(51) Int. Cl.
*B60T 8/40*     (2006.01)
*B60T 7/04*     (2006.01)
(Continued)

(52) U.S. Cl.
CPC ............ *B60T 8/4036* (2013.01); *B60T 7/042* (2013.01); *B60T 8/1755* (2013.01); *B60T 8/176* (2013.01);
(Continued)

(58) Field of Classification Search
CPC .... B60T 13/745; B60T 13/686; B60T 17/225; B60T 2270/404; B60T 2270/413;
(Continued)

(56) References Cited

U.S. PATENT DOCUMENTS 4,503,677 A   3/1985  Crumb et al.
4,813,448 A   3/1989  Leiber
(Continued)

FOREIGN PATENT DOCUMENTS

CN    86107094 A    5/1987
CN    1374218 A    10/2002
(Continued)

OTHER PUBLICATIONS

GB Combined Search and Examination Report for the related U.K. Application No. 2219297.5 dated Feb. 1, 2023.
(Continued)

*Primary Examiner* — Bradley T King
(74) *Attorney, Agent, or Firm* — Panitch Schwarze Belsiario & Nadel LLP

(57) ABSTRACT

A brake system may include an actuation device that may actuate a first piston-cylinder unit to apply pressure medium to at least one brake circuit via a valve device, where a piston of the first piston-cylinder unit separate first and second working chambers; a second piston-cylinder unit, having an electromotive drive and a transmission to feed pressure medium to at least one of the brake circuits via a valve device; and a motor-pump unit having a valve device to feed pressure medium to the brake circuits. The motor of the electromotive drive of the second piston-cylinder unit and the motor of the motor-pump unit may be used jointly or independently of one another, under control of a control device. The motor-pump unit is connected via two hydraulic connections, one or both of which may incorporate separat- (Continued)

ing valves, to the first and second working chambers of the first piston-cylinder unit.

26 Claims, 9 Drawing Sheets

(51) Int. Cl.
| | |
|---|---|
| *B60T 8/1755* | (2006.01) |
| *B60T 8/176* | (2006.01) |
| *B60T 8/1761* | (2006.01) |
| *B60T 8/26* | (2006.01) |
| *B60T 8/88* | (2006.01) |
| *B60T 13/14* | (2006.01) |
| *B60T 13/16* | (2006.01) |
| *B60T 13/58* | (2006.01) |
| *B60T 13/66* | (2006.01) |
| *B60T 13/68* | (2006.01) |
| *B60T 13/74* | (2006.01) |
| *B60T 17/22* | (2006.01) |

(52) U.S. Cl.
CPC .......... *B60T 8/17616* (2013.01); *B60T 8/268* (2013.01); *B60T 8/4022* (2013.01); *B60T 8/4081* (2013.01); *B60T 8/885* (2013.01); *B60T 13/145* (2013.01); *B60T 13/16* (2013.01); *B60T 13/165* (2013.01); *B60T 13/58* (2013.01); *B60T 13/586* (2013.01); *B60T 13/662* (2013.01); *B60T 13/686* (2013.01); *B60T 13/745* (2013.01); *B60T 17/221* (2013.01); *B60T 2220/04* (2013.01); *B60T 2260/08* (2013.01); *B60T 2270/10* (2013.01); *B60T 2270/30* (2013.01); *B60T 2270/306* (2013.01); *B60T 2270/402* (2013.01); *B60T 2270/403* (2013.01); *B60T 2270/404* (2013.01); *B60T 2270/413* (2013.01); *B60T 2270/604* (2013.01); *B60T 2270/82* (2013.01); *B60T 2270/88* (2013.01)

(58) Field of Classification Search
CPC .. B60T 2270/604; B60T 7/042; B60T 8/4036; B60T 8/1755; B60T 8/176; B60T 8/1716; B60T 8/268; B60T 8/4022; B60T 8/4081; B60T 8/885; B60T 13/145; B60T 13/16; B60T 13/165; B60T 13/58; B60T 13/586; B60T 13/662; B60T 17/221; B60T 2220/04; B60T 2260/08; B60T 2270/10; B60T 2270/30; B60T 2270/306; B60T 2270/402; B60T 2270/403; B60T 2270/82; B60T 2270/88
See application file for complete search history.

(56) References Cited

U.S. PATENT DOCUMENTS

| | | |
|---|---|---|
| 5,051,861 A | 9/1991 | Purkayastha et al. |
| 5,054,861 A | 10/1991 | Resch |
| 5,076,593 A | 12/1991 | Sullivan et al. |
| 5,826,954 A | 10/1998 | Schmitt et al. |
| 5,941,608 A | 8/1999 | Campau et al. |
| 8,926,027 B2 | 1/2015 | Shimada |
| 9,878,697 B2 | 1/2018 | Leiber et al. |
| 9,914,440 B2 | 3/2018 | Bauer et al. |
| 10,059,321 B2 | 8/2018 | van Zanten et al. |
| 10,688,979 B2 | 6/2020 | Leiber et al. |
| 11,458,943 B2 | 10/2022 | Leiber et al. |
| 11,472,388 B2 | 10/2022 | Leiber et al. |
| 11,618,424 B2* | 4/2023 | Nakagawa ............ B60T 13/686 |
| | | 303/10 |
| 2003/0201669 A1 | 10/2003 | Yokoyama et al. |
| 2004/0215385 A1* | 10/2004 | Aizawa .................. B60T 7/12 |
| | | 701/93 |
| 2008/0150354 A1 | 6/2008 | Ohlig et al. |
| 2008/0169702 A1 | 7/2008 | Ohnishi |
| 2009/0226298 A1 | 9/2009 | Kajiyama et al. |
| 2010/0113215 A1 | 5/2010 | Jager et al. |
| 2010/0226793 A1 | 9/2010 | Beck |
| 2011/0254362 A1 | 10/2011 | Maury et al. |
| 2011/0285200 A1 | 11/2011 | Hatano et al. |
| 2012/0112525 A1 | 5/2012 | Shimada |
| 2013/0026818 A1 | 1/2013 | Schmidt et al. |
| 2013/0184953 A1 | 7/2013 | Morishita |
| 2014/0028084 A1* | 1/2014 | Biller .................... B60T 13/686 |
| | | 303/9.62 |
| 2014/0152085 A1 | 6/2014 | Biller et al. |
| 2014/0203626 A1 | 7/2014 | Biller et al. |
| 2014/0284151 A1 | 9/2014 | Yokoyama et al. |
| 2014/0346852 A1 | 11/2014 | Thrasher |
| 2015/0008727 A1 | 1/2015 | Kidera et al. |
| 2015/0020520 A1 | 1/2015 | Feigel et al. |
| 2015/0028667 A1 | 1/2015 | Leiber et al. |
| 2015/0115701 A1 | 4/2015 | Koo |
| 2015/0175146 A1 | 6/2015 | Quirant et al. |
| 2015/0203086 A1 | 7/2015 | Miyazaki |
| 2015/0283987 A1* | 10/2015 | Bareiss ................. B60T 8/171 |
| | | 701/70 |
| 2016/0009263 A1 | 1/2016 | Feigel et al. |
| 2016/0033326 A1 | 2/2016 | Ueno |
| 2016/0082937 A1 | 3/2016 | Nakaoka et al. |
| 2016/0082938 A1 | 3/2016 | Vollert et al. |
| 2016/0121860 A1 | 5/2016 | Brown |
| 2016/0229383 A1 | 8/2016 | Leiber et al. |
| 2016/0278245 A1 | 9/2016 | Koga et al. |
| 2016/0311422 A1 | 10/2016 | van Zanten et al. |
| 2016/0339885 A1 | 11/2016 | Linhoff et al. |
| 2016/0355169 A1 | 12/2016 | Ohlig et al. |
| 2016/0375886 A1 | 12/2016 | Jung |
| 2017/0001612 A1 | 1/2017 | Bauer et al. |
| 2017/0106843 A1 | 4/2017 | Jeong |
| 2017/0114849 A1 | 4/2017 | Gadke et al. |
| 2017/0129468 A1 | 5/2017 | Besier et al. |
| 2017/0144643 A1 | 5/2017 | Kim et al. |
| 2017/0158179 A1 | 6/2017 | Choi et al. |
| 2017/0158184 A1 | 6/2017 | Choi et al. |
| 2017/0182992 A1 | 6/2017 | Matsunaga et al. |
| 2017/0183009 A1 | 6/2017 | Isono et al. |
| 2017/0210363 A1 | 7/2017 | Klinger et al. |
| 2017/0210372 A1 | 7/2017 | Feigel |
| 2017/0264229 A1 | 9/2017 | Murata et al. |
| 2017/0282877 A1 | 10/2017 | Besier et al. |
| 2017/0282879 A1 | 10/2017 | Matsunaga |
| 2017/0282881 A1 | 10/2017 | Nakamura |
| 2017/0327098 A1 | 11/2017 | Leiber et al. |
| 2017/0341632 A1 | 11/2017 | Han et al. |
| 2017/0361825 A1* | 12/2017 | Drumm ................. B60T 8/4081 |
| 2018/0006505 A1 | 1/2018 | Nakano et al. |
| 2018/0079313 A1* | 3/2018 | Foitzik ................. B60T 13/741 |
| 2018/0093576 A1 | 4/2018 | Ayala et al. |
| 2018/0118183 A1 | 5/2018 | Spieker |
| 2019/0016321 A1 | 1/2019 | Dinkel |
| 2019/0039583 A1 | 2/2019 | Besier et al. |
| 2019/0202425 A1 | 7/2019 | Feigel et al. |
| 2019/0241167 A1 | 8/2019 | Peichl et al. |
| 2019/0308596 A1 | 10/2019 | Besier et al. |
| 2019/0344769 A1 | 11/2019 | Zimmermann et al. |
| 2020/0039490 A1* | 2/2020 | Kobayashi ............ B60T 13/662 |
| 2020/0139948 A1 | 5/2020 | Leiber et al. |
| 2020/0290581 A1* | 9/2020 | Kawakami ............. B60T 13/18 |
| 2020/0307536 A1* | 10/2020 | Biller .................... B60T 13/686 |
| 2020/0317174 A1* | 10/2020 | Terasaka ............... B60T 13/741 |
| 2021/0053546 A1 | 2/2021 | Plewnia |
| 2021/0114569 A1* | 4/2021 | Yamamoto ............ B60T 8/1766 |
| 2021/0122348 A1 | 4/2021 | Leiber |

(56) References Cited

U.S. PATENT DOCUMENTS

| | | | |
|---|---|---|---|
| 2022/0126802 A1 | 4/2022 | Leiber et al. | |
| 2022/0135010 A1 | 5/2022 | Leiber et al. | |

FOREIGN PATENT DOCUMENTS

| | | | |
|---|---|---|---|
| CN | 101896382 A | 11/2010 | |
| CN | 102556031 A | 7/2012 | |
| CN | 103010199 A | 4/2013 | |
| CN | 103264639 A | 8/2013 | |
| CN | 104039615 A | 9/2014 | |
| CN | 104105626 A | 10/2014 | |
| CN | 104640752 A | 5/2015 | |
| CN | 105026232 A | 11/2015 | |
| CN | 105584472 A | 5/2016 | |
| CN | 105799670 A | 7/2016 | |
| CN | 105813911 A | 7/2016 | |
| CN | 106458179 A | 2/2017 | |
| CN | 106794829 A | 5/2017 | |
| DE | 3236535 A1 | 4/1984 | |
| DE | 3307337 C2 | 11/1991 | |
| DE | 19541601 A1 | 5/1997 | |
| DE | 102005017958 A1 | 4/2006 | |
| DE | 102005018 649 A1 | 10/2006 | |
| DE | 102005055 751 A1 | 11/2006 | |
| DE | 19929414 B4 | 10/2007 | |
| DE | 102007059374 A1 | 6/2009 | |
| DE | 102009033499 A1 | 1/2010 | |
| DE | 102010001532 A1 | 8/2011 | |
| DE | 102010003081 A1 | 8/2011 | |
| DE | 102010023865 A1 | 12/2011 | |
| DE | 102010045617 A1 | 3/2012 | |
| DE | 11 2009 004 636 A5 | 6/2012 | |
| DE | 102012201535 A1 | 10/2012 | |
| DE | 102012205860 A1 | 10/2012 | |
| DE | 102012210809 A1 | 1/2013 | |
| DE | 112011103274 A5 | 7/2013 | |
| DE | 102012002791 A1 | 8/2013 | |
| DE | 102013214212 A1 | 2/2014 | |
| DE | 102014200071 A1 | 9/2014 | |
| DE | 102014205645 A1 | 10/2014 | |
| DE | 102014009127 A1 | 6/2015 | |
| DE | 102015208148 A1 | 12/2015 | |
| DE | 102014109628 A1 | 1/2016 | |
| DE | 202015107079 U1 | 2/2016 | |
| DE | 102014222753 A1 | 5/2016 | |
| DE | 102014117726 A1 | 6/2016 | |
| DE | 102014225958 A1 | 6/2016 | |
| DE | 202015008975 U1 | 6/2016 | |
| DE | 102015103859 A1 | 9/2016 | |
| DE | 102015104246 A1 | 9/2016 | |
| DE | 102016203111 A1 | 9/2016 | |
| DE | 10 2015 106 089.2 A1 | 10/2016 | |
| DE | 102016217273 A1 | 3/2017 | |
| DE | 102016224057 A1 | 6/2017 | |
| DE | 102016224062 A1 | 6/2017 | |
| DE | 102016105232 A1 | 9/2017 | |
| DE | 10 2016 112 971 A1 | 1/2018 | |
| DE | 102016211982 A1 | 1/2018 | |
| DE | 202019101596 U1 | 5/2020 | |
| EP | 0095403 A1 | 11/1983 | |
| EP | 0105219 B2 | 8/1986 | |
| EP | 1103436 A2 | 5/2001 | |
| EP | 1371535 A2 | 12/2003 | |
| EP | 1533537 A2 | 5/2005 | |
| EP | 1964739 A2 | 9/2008 | |
| EP | 2225133 B1 | 9/2010 | |
| EP | 2409885 A1 | 1/2012 | |
| EP | 2602163 A1 | 6/2013 | |
| EP | 2719593 A1 | 4/2014 | |
| EP | 2744691 B1 | 7/2015 | |
| EP | 2995516 A1 | 3/2016 | |
| EP | 2998173 A1 | 3/2016 | |
| GB | 2443921 A | 5/2008 | |
| GB | 2540193 A | 1/2017 | |
| JP | H0656022 A | 3/1994 | |
| JP | 2001206209 A | 7/2001 | |
| JP | 2006275120 A | 10/2006 | |
| JP | 2012126170 A | 7/2012 | |
| JP | 2015071382 A | 4/2015 | |
| JP | 2016112946 A | 6/2016 | |
| JP | 2016147614 A | 8/2016 | |
| KR | 20170012348 A | 2/2017 | |
| WO | 2008096224 A1 | 8/2008 | |
| WO | 2009065709 A1 | 5/2009 | |
| WO | 2010088920 A1 | 8/2010 | |
| WO | 2010091130 A2 | 8/2010 | |
| WO | 2010092083 A1 | 8/2010 | |
| WO | 2011029812 A1 | 3/2011 | |
| WO | 2011098178 A1 | 8/2011 | |
| WO | 2012019802 A1 | 2/2012 | |
| WO | 2012028568 A1 | 3/2012 | |
| WO | 2012034661 A1 | 3/2012 | |
| WO | 2012055616 A1 | 5/2012 | |
| WO | 2012143175 A2 | 10/2012 | |
| WO | 2012143311 A1 | 10/2012 | |
| WO | 2013023953 A1 | 2/2013 | |
| WO | 2013072198 A2 | 5/2013 | |
| WO | 2014135454 A1 | 9/2014 | |
| WO | 2014154631 A2 | 10/2014 | |
| WO | 2015078651 A1 | 6/2015 | |
| WO | 2015096914 A1 | 7/2015 | |
| WO | 2015106892 A1 | 7/2015 | |
| WO | 2015173134 A1 | 11/2015 | |
| WO | 2016000865 A1 | 1/2016 | |
| WO | 2016005372 A1 | 1/2016 | |
| WO | 2016012331 A1 | 1/2016 | |
| WO | 2016023994 A1 | 2/2016 | |
| WO | 2016087505 A1 | 6/2016 | |
| WO | 2016096533 A1 | 6/2016 | |
| WO | 2016120292 A1 | 8/2016 | |
| WO | 2016128172 A1 | 8/2016 | |
| WO | 2016146222 A2 | 9/2016 | |
| WO | 2016146692 A1 | 9/2016 | |
| WO | 2016150745 A1 | 9/2016 | |
| WO | 2017022545 A1 | 2/2017 | |
| WO | 2017047312 A1 | 3/2017 | |
| WO | 2017135029 A1 | 8/2017 | |
| WO | 2017162593 A1 | 9/2017 | |
| WO | 2018073039 A1 | 4/2018 | |
| WO | 2018130393 A1 | 7/2018 | |
| WO | 2019002475 A1 | 1/2019 | |
| WO | 2019214833 A1 | 11/2019 | |

OTHER PUBLICATIONS

Office Action issued Mar. 10, 2023 in U.S. Appl. No. 17/883,700.
GB Search Report for the related U.K. Application No. 2211088.6 dated Aug. 23, 2022.
GB Combined Search and Examination Report for the related U.K. Application No. 2211088.6 dated Aug. 24, 2022.
Int'l Search Report and Written Opinion issued Mar. 16, 2018 in Int'l Application No. PCT/EP2017/071738, translation of ISR only.
Int'l Search Report and Written Opinion issued Oct. 30, 2018 in Int'l Application No. PCT/EP2018/061995, translation of ISR only.
Int'l Search Report and Written Opinion issued Nov. 30, 2018 in Int'l Application No. PCT/EP2018/066436, translation of ISR only.
Int'l Search Report and Written Opinion issued Aug. 14, 2019 in Int'l Application No. PCT/EP2019/061371.
Int'l Search Report and Written Opinion issued Nov. 28, 2018 in Int'l Application No. PCT/EP2018/072363, ISR Translation Only.
Int'l Search Report and Written Opinion issued Aug. 13, 2019 in Int'l Application No. PCT/EP2019/061365, Translation of ISR Only.
Office Action issued Aug. 6, 2021 in U.S. Appl. No. 16/625,228 by Leiber.
Office Action issued Sep. 14, 2021 in Chinese Application No. 201780093316.1.
Office Action issued Oct. 20, 2021 in Chinese Application No. 201880040827.1.
Office Action issued Nov. 3, 2021 in Chinese Application No. 201880040785.1.

(56) References Cited

OTHER PUBLICATIONS

Office Action issued Jan. 21, 2022 in British Application No. 2000691.2.
Office Action in U.S. Appl. No. 16/624,412 of Leiber et al., mailed Apr. 20, 2022.
Office Action in U.S. Appl. No. 16/624,505 of Leiber et al., mailed May 12, 2022.
Office Action issued May 30, 2022 in Japanese Application No. 2019-570915 (with English translation).
Office Action issued Aug. 24, 2022 in Great Britian Application No. GB2211088.6.
GB Combined Search and Examination Report for the related U.K. Application No. 2212200.6 dated Nov. 2, 2022.
GB Combined Search and Examination Report for the related U.K. Application No. 2213645.1 dated Nov. 4, 2022.
Office Action in U.S. Appl. No. 16/624,505 of Leiber et al., mailed Nov. 25, 2022.
Int'l Search Report and Written Opinion issued Oct. 30, 2018 in Int'l Application No. PCT/EP2018/061995, English translation of Int'l Search Report only.
Int'l Search Report and Written Opinion issued Nov. 28, 2018 in Int'l Application No. PCT/EP2018/072363, English translation of Int'l Search Report only.
Int'l Search Report issued Nov. 30, 2018 in Int'l Application No. PCT/EP2018/066436.
Office Action issued Jul. 8, 2023 in Chinese Application No. 201880040785.1 with English Translation.
Office Action issued Jul. 10, 2023 in DE Application No. 112018003140.3.
Office Action issued Jul. 10, 2023 in DE Application No. 112018003150.0.
Office Action issued Jul. 20, 2023 in U.S. Appl. No. 18/114,099.
Office Action issued Jun. 8, 2023 in U.S. Appl. No. 16/624,412.
Office Action issued Jun. 6, 2023 in Chinese Application No. 202080042804.1.
Notice of Allowance issued Jan. 4, 2024 in U.S. Appl. No. 16/624,412.
Notice of Allowance issued Oct. 12, 2023 in U.S. Appl. No. 17/883,700.
Notice of Allowance issued Jul. 19, 2024 in U.S. Appl. No. 17/608,471.
Office Action issued Nov. 14, 2024, in U.S. Appl. No. 18/630,243, by Leiber et al.
Office Action issued Nov. 27, 2024, in U.S. Appl. No. 18/639,874, by Leiber et al.

* cited by examiner

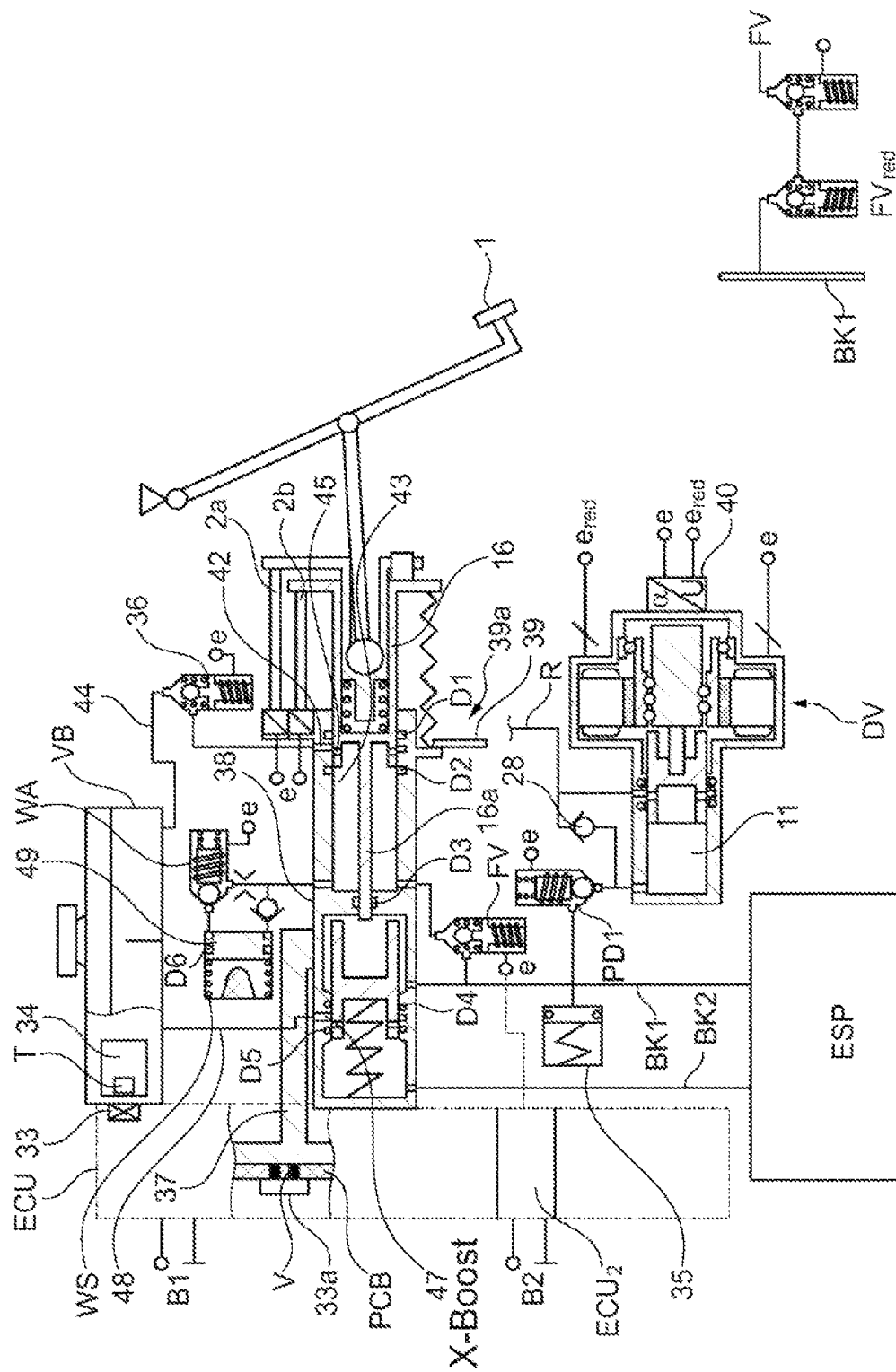

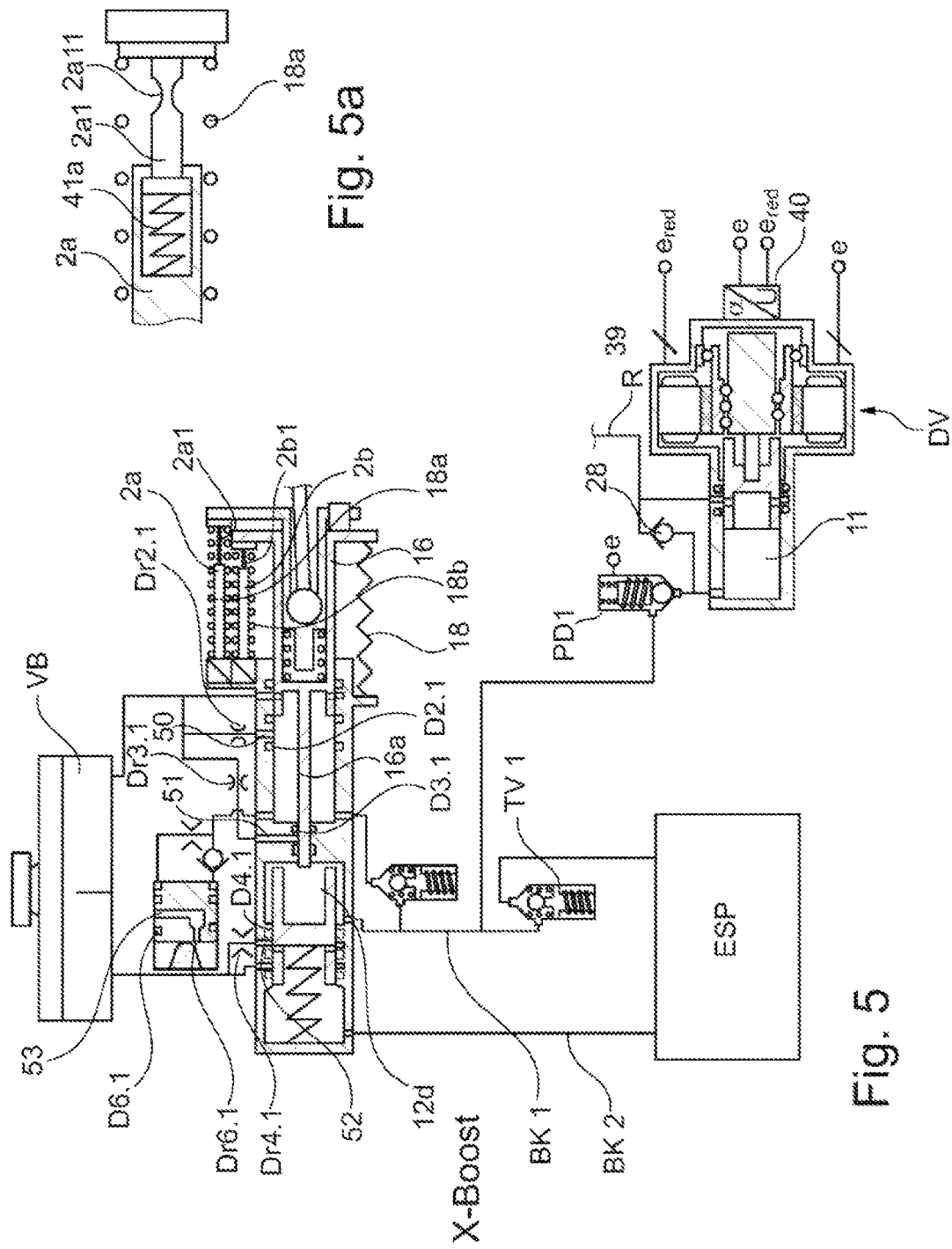

BRAKE SYSTEM

CROSS-REFERENCE TO RELATED APPLICATION

This application is a Section 371 of International Application No. PCT/EP2018/072363, filed Aug. 17, 2018, which was published in the German language on Nov. 14, 2019 under International Publication No. WO 2019/214833 A1, which claims priority under 35 U.S.C. § 119 (b) to International Patent Application No. PCT/EP2018/061995, filed May 9, 2018, and International Patent Application No. PCT/EP2018/066436, filed Jun. 20, 2018, the disclosures of which are incorporated herein by reference.

The invention relates to a brake system according to the preamble of claim 1.

DESCRIPTION OF THE PRIOR ART

The trend towards vehicles with autonomous driving (AD) places high demands on the brake system in terms of fault tolerance on the one hand and redundant functions, e.g. for brake pressure generation, power supply and computer functions (ECU) on the other. So-called one-box and two-box systems are favored. The latter consist of an electric brake booster (BKV), a so-called e-booster, and an ESP system (Electronic Stability Control System). This makes, for example, the generation of brake pressure via electric motor and electronic control unit—also engine control unit (Electronic Control Unit or ECU)—redundant for e-boosters and return pumps with electric motor and ECU.

The known solutions have relatively long lengths and a high weight.

In WO2011/098178 (hereinafter referred to as variant A or as a follow-up booster or e-booster), such a solution is described with a coaxial drive in which an electric motor acts via a gear and piston on the HZ piston (=main cylinder piston). The BKV control is effected via an electrical element and reaction disc as a so-called follow-up booster, the pedal travel is a function of the brake pressure and the volume absorption of the brake system, which requires long pedal travel in the event of fading or brake circuit failure.

WO2009/065709 (hereinafter referred to as variant B, or as a follow-up booster or e-booster) also shows an e-booster as a follower BKV. Here the BKV control takes place via pedal travel and pressure. A separate pressure supply with electric motor and plunger acts via the amplifier piston on the HZ piston.

WO2012/019802 (hereinafter variant C) shows an arrangement similar to WO2011/098178 with coaxial drive in which an electric motor acts on the HZ piston via a gear and piston. An additional piston cylinder unit is used here, which acts on a travel simulator piston (WS). The pedal travel is thus independent of e.g. fading and brake circuit failure. However, the complexity and the construction length are high.

DE 10 2009 033 499 (hereinafter also referred to as variant D) shows a brake booster (BKV) with additional ESP unit with hydraulic actuation of the booster piston and external pressure supply. This arrangement with four or five pistons and six solenoid valves (MV) is complex and unfavorable in length. The non-hydraulically acting travel simulator (WS) is located within the piston-cylinder unit upstream of the main cylinder and cannot be damped or switched via a solenoid valve (MV).

All above mentioned solutions have a redundant brake force amplification (BKV) function, because in case of failure of the BKV motor the ESP unit with pump similar to the assistance functions with vacuum BKV guarantees the brake function in autonomous driving mode.

In the event of failure of the ESP motor, ABS shall function via the possibility of pressure modulation by the BKV motor as described in WO2010/088920 of the applicant. However, this only allows a common pressure control for all four wheels, which does not result in an optimal braking distance.

All previously known one-box systems have a so-called travel simulator (especially for brake-by-wire) because of the advanced pedal travel characteristics.

The known systems with e-booster and ESP have only one redundancy in the pressure supply (DV), i.e. if the e-booster fails, there is a redundant pressure supply (DV) with redundant power for the brake booster (BKV) by the ESP. Higher safety requirements are not taken into account.

OBJECT OF THE INVENTION

Based on the prior art, it is the object of this invention to provide an improved brake system.

In particular the invention is based on the object of creating a brake system for use in autonomous driving operation (hereinafter AD) and/or electric vehicles/hybrid vehicles with increasingly strong recuperation power (energy recovery by braking via generator/or drive motor in generator operation). Preferably the weight is reduced and/or the dimensions of the system are reduced and/or the reliability is increased.

Preferably, a cost-effective brake system for autonomous driving is to be created, which fulfils all required redundancies as well as very high safety requirements.

Furthermore, if the ESP should fail, both an adequate function of the ABS in respect of braking distance and stability, and an adequate function of the recuperation are to be achieved with the brake system.

SOLUTION ACCORDING TO THE INVENTION

This object is solved according to the invention with the features of patent claim 1.

Among other things, the improvement is characterized in that the design of the brake booster has very few simple components with low tolerance requirements (e.g. valves only in open/closed operation) and is therefore cost-effective, very short and narrow in design and enables a constant pedal travel characteristic, especially with strong recuperation.

Advantageous embodiments or designs of the invention are contained in the further claims, the drawing and the figure description to which reference is made here.

With the solution according to the invention and its embodiments and designs, a brake system is created which has a very short construction as well as an advantageous pedal characteristic.

In particular, a two-box system is created according to the invention, having an electric brake booster which is connected to a standard ESP unit via two hydraulic lines (hereinafter referred to as X-Boost and ESP/ABS unit, together referred to as two-box system), wherein the brake booster has a pedal characteristic which is independent of the volume absorption of the brake system and the degree of recuperation.

Furthermore, the invention achieves a compact design of the brake booster with a low box volume, which is very short and narrow and has many redundancies, e.g. for pressure generation, electrical supply, failure of the pump motor of the ESP unit and also includes an ABS function with reduced performance in the event of failure of the ESP unit. In emergency operation without ESP, the ABS function should include at least individual regulation axle-by-axle to improve the braking distance ("select-low" pressure regulation).

The installation spaces in the unit compartment are becoming smaller and smaller, thus the dimensions of the brake unit should be as small as possible, especially in terms of width and length. This compact design is possible on the one hand by decoupling the main cylinder (HZ) piston from the motor drive and on the other hand by a special short main cylinder (HZ) according to WO2016/023994 of the applicant, which is referred to here with parallel arranged pressure supply (hereinafter pressure supply or DV) consisting of electric motor with piston drive.

The pressure supply DV is only effective up to the wheel locking limit of 80 to 100 bar. For higher pressures (e.g. for driver assistance functions), the pump of the ESP unit is switched on. This can therefore be realized with the solution according to the invention in comparison to variant A of the prior art described above, since the ESP pump function has no influence on the pedal feel, since the brake pedal is decoupled.

In the pedal characteristic, a retroactive effect from volume absorption, e.g. in the event of brake circuit failure, should be excluded. On the other hand, it should be possible to generate a desired pedal feedback, e.g. a small pedal movement when using the ABS function, optionally also intermittently. Faults, e.g. brake circuit failure, can also be indicated by moving the pedal parallel to the warning lamp.

Various solutions are conceivable for the pedal travel simulator. In the entire pressure range (150 to 200 bar) the pedal travel simulator should deliver a good pedal travel characteristic, e.g. up to 30 bar with a flat characteristic curve and then progressively increasing without influence whether the X-Boost or the ESP unit delivers the pressure. In the embodiment of the e-booster as a follow-up booster (variant A according to the prior art), the pedal force characteristic curve changes significantly during the transition from e-booster to ESP and requires a lot of software effort for the PWM operation of the valves necessary for this. This is not the case with the solution according to the invention, since the operation of the ESP pump has no influence on the pedal characteristics, since the pedal is decoupled via the travel simulator.

To reduce the construction volume, the return spring can be used in the flat part of the pedal travel characteristic curve, so that the volume in the piston travel simulator is smaller and only corresponds to the progressive part of the characteristic curve, as also shown in WO2013/072198 of the applicant, to which reference is made here.

The travel simulator can be advantageously a piston simulator (WS) connected to the working chamber of the auxiliary piston via a hydraulic connecting line or/and a plunger simulator connected to a working chamber of the second piston (SK). If a plunger simulator is provided, the control pressure dependent on the pedal travel acts on the plunger.

It is also advantageous if the travel simulator can be switched off in a further development and is not effective in a first range and the brake pedal force is determined exclusively by a return spring and is determined in a second range by the return spring and travel simulator piston.

In addition, a switching valve can be connected upstream of the travel simulator in order to switch the travel simulator on or off as required. However, if no switching valve is connected upstream of the travel simulator, the switching valve (WA) must be arranged in a branch line branching off from the pressure or working chamber of the auxiliary piston to the travel simulator to the storage container.

It is also advantageous if the pressure-volume characteristic is used for pressure supply control and diagnostics.

Another possibility for the realization of a pedal travel simulator is a THZ (=tandem main brake cylinder) with plunger without piston travel simulator as described or illustrated in WO2016/023994 of the applicant, to which reference is made here in this respect. Here, the control pressure to the BKV, which depends on the pedal travel, acts on the plunger and thus generates the pedal feedback effect.

Depending on the pedal position, pressure is transmitted from the piston of the pressure supply to the SK piston of the main brake cylinder (T) HZ, which creates the brake pressure. The pressure supply consists of an electric motor which drives the piston via a spindle. Both a ball screw drive (KGT) and a trapezoidal spindle with nut can be used as transmissions. The latter is cheaper and quiet, but has a lower efficiency and is self-locking. The latter has the advantage that in the event of a failure in the pressure supply DV, e.g. of the engine, the piston remains in the position so that there is no increase in volume in the brake circuit under the influence of brake pressure.

For the ball screw drive (KGT), an additional shut-off valve must be used for this failure. The aspiration of the liquid from the storage container (VB) takes place via a suction valve or via the piston sleeve seal with a breather bore, as in a main cylinder (HZ).

Access to the piston travel simulator can be closed with a solenoid valve (WA), as in the event of a pressure supply failure (DV) the pedal force acts on the main cylinder (HZ) and thus generates brake pressure in the so-called fallback level (RFE). Without the valve (WA), the pedal travel in the fallback level (RFE) would be extended by the volume absorption of the piston travel simulator (WS).

Since the interconnection of X-Boost and ESP unit provides two redundant systems for pressure generation with redundant power supply, the fallback level (RFE) is only effective during towing, actually only for deep loading, e.g. in the event that the transmission of the vehicle may be blocked. These facts allow greater degrees of freedom in system and piston design, e.g. saving a WA solenoid valve.

In one embodiment X-Boost and ESP unit have separate power supplies, e.g. ESP is connected to a 12V battery and X-Boost is connected to a DC/DC converter of a multi-voltage vehicle electrical system. Alternatively, both X-Boost and ESP unit can be connected to both 12V battery and DC/DC converter. Thus both modules of the brake system of the two-box have a redundant power supply in each case.

Some of the solutions according to the invention have even more advantages over the prior art variant A:
I. If the brake circuit fails, there is no pedal through fall;
II. If the ESP motor fails, the pressure can also be controlled axle by axle, which enables a considerable reduction in braking distance;
III. Many driver assistance functions can be implemented in X-Boost and can be implemented with greater precision than in the ESP unit; and/or
IV. Recuperation control is easier, quieter and more accurate by control via the DV than via inlet and outlet valves and the pump of the ESP unit.

Pedal through fall I) can thus be avoided, since a leak in the system has no effect on the pedal feeling, since the travel simulator is decoupled. In contrast to the solution according to the invention, a leak in the system has a direct effect on the pedal feeling in variants A and B, for example, so that in the worst case the pedal travel is suddenly extended and the change cannot be controlled by the driver and leads to accidents.

The individual pressure regulation II) of axles is made possible by the solution according to the invention because in the event of failure of the ESP motor, the electric motor of the pressure supply DV of the X-Boost takes over the pressure regulation and the pressure regulation has no influence on the pedal. This means that there are considerably more degrees of freedom than with follow-up booster solutions (variants A and B). For this purpose, the pressure control of the invention via the piston travel and motor current in accordance with (DE 10 2005 018649 of the applicant) and pressure gradient regulation (DE 10 2005 055751 of the applicant), to which reference is made here in this respect, is used for a high-precision pressure control which cannot be achieved with pulse width modulation (PWM) control of valves of the ESP unit.

The system decoupling (pedal of the system) is also of great importance for the implementation of III) driver assistance functions, as described in more detail below.

Recuperation control (IV) is becoming increasingly important due to the increasing hybridization and spread of electric vehicles. The brake pressure is varied depending on the possible generator braking effect and the total braking effect required from the driver. This is called brake pressure blending. This may involve all wheel brakes (four-wheel blending), just one vehicle axle (two-wheel blending), or the single wheel brakes individually. It requires appropriate brake pressure control and valve control. This is described in detail in the description of the drawings.

The recuperation control (IV) in one of the solutions according to the invention is carried out exclusively via the piston travel control of the pressure supply DV, e.g. in the case of four-wheel blending. Depending on the deceleration effect of the generator of the vehicle or the drive motor of an electric vehicle operated in generator mode, a corresponding braking pressure is set by adjusting the piston so that the sum of the hydraulic braking force and the braking effect by the drive motor results in the desired total deceleration force.

This is possible in a completely variable manner, as the pressure position of the pressure supply DV of the X-Boost has no effect on the pedal feel. This has considerable advantages, especially compared to the variants A and B of the prior art, where the coupling between the pedal and the HZ volume means that the storage chambers of the ESP unit have to be emptied in order to achieve a reduced deceleration while maintaining the same pedal feel. This requires an intervention in ESP and a very complex control of the outlet valves of the ESP unit. In addition, with some of the solutions according to the invention, different ESP variants for different brake circuit distribution (diagonal and parallel/brake circuits axle by axle, rear and front drives) can be avoided, since control takes place exclusively via the piston, independent of the brake circuit distribution and the drive type. In particular, the following advantages of the X-Boost also result from the recuperation.

Axle-by-axle blending (two-wheel blending or axle-by-axle blending) is much easier to implement, as will be described below in greater detail.

Some of the solution approaches according to the invention offer the following advantages in the pedal feel compared to the prior art:

No change in pedal feel due to blending

No change in pedal feel due to changes in the brake system (e.g. changes in brake release clearance, changes in PV characteristic curve)

Blending offers the following advantages in summary:

Precise adjustment of brake pressures, even with rapid changes in generator torque=>Simple point braking;

No perceptible noises, e.g. from switching valves in the ESP unit;

Blending in the entire vehicle deceleration range;

Much simpler software for blending than conventional e-boosters;

Uniform blending for diagonal (X) and axis-parallel (II) brake circuit division;

Brake force distribution can be displayed at will, up to the wheel lock limit. ESP interventions for vehicle stabilization, especially on slippery and uneven road surfaces, and interruptions of the recuperation process with complex switching from recuperation to purely hydraulic braking and vice versa, can thus be avoided;

Changes to the wheel brakes (e.g. pressure-volume characteristics or p-V characteristics) on the non-driven axle have no influence on the hydraulic braking;

No additional components required to hold hydraulic fluid (e.g. no "smart actuator");

No harder return spring required for pedal (important for Pmax in RFE); and/or. Changes in the PV characteristic curve of the brake system are diagnosed.

In known systems according to variant A with follow-up booster, the pedal travel is a function of the volume take-up. To prevent the pedal travel from becoming large during normal operation, it is necessary to adjust the dimensions of the main cylinder HZ for different vehicle types with different piston diameters. In the event of a system failure in the fallback level RFE, this leads to high pedal forces with the same pedal travel in brake systems with greater volume absorption. In accordance with the requirements of ECE-13H, a vehicle deceleration of at least 0.24-0.3 g is required for a maximum foot force of 500 N.

Some of the solutions according to the invention allow the use of a small auxiliary piston diameter in comparison to the SK piston and thus higher brake pressures in the fallback level RFE at 500 N foot force. In addition, the volume in the brake circuits can be further increased with brake fading in that DV continues to convey. This additional volume must be able to be transferred from the SK piston into the floating circuit, either by a larger diameter of the SK piston than the auxiliary piston or by a larger travel of the SK piston.

The BKV is controlled in one embodiment in accordance with DE 10 2005 018649 and DE 10 2005 055751 of the applicant, to which reference is made here in this respect, via the piston of the pressure supply DV by applying a pressure in the brake circuit via a BKV characteristic curve as a function of the pedal travel. The pressure is measured in the ESP unit and provided by the pressure supply DV via a corresponding piston travel. If the pressure sensor fails, this pressure signal is not available. The pressure sensor failure is detected by the pressure supply DV via evaluation of the pressure volume characteristic curve (p-V characteristic curve). Here the corresponding pressure value is missing for the piston travel.

The current measurement of the DV motor can also be used here as a replacement for the pressure measurement. In general, it is also conceivable to use only current measurement. For the corresponding accuracy for pressure build-up and reduction, the hysteresis must be included in the characteristic curve of the pressure supply DV (piston travel and pressure or current alternatively) by the friction forces in the drive, optionally with correction values, e.g. by correlation of the current with the vehicle deceleration.

The concept has further potential to increase function and error safety through:

a) Function.

A small accumulator coupled to brake circuit 1 (BK1), also called mini storage container, which enables the ESP pump to build up further pressure in the wheel brake cylinders during the suction stroke of the pressure supply (DV).

Hydraulic pedal force blending in the fallback plane b) Safety

Use of an additional isolating valve (TV1) in brake circuit 1 (BK1) in case of failure of brake circuit 1 (BK1)

Use of an additional isolating valve (TV2) in brake circuit 2 (BK2) in case of failure of brake circuit 2 (BK2)

Dispensing with the travel simulator shut-off valve (WA). This also eliminates its possible errors Measures against blocking the sensor actuation.

Linear level transmitter for brake fluid in the storage container (VB), which detects small volume changes in the storage container (VB) and can give an early warning in the event of a leak in the brake system.

Additional shut-off valve (36) in the hydraulic connection from the auxiliary piston chamber to the storage container (VB)

Redundant seals with diagnostic option for main cylinder (THZ) and pressure supply (DV)

Redundant measures, e.g. additional shut-off valve (MVs) in the return line from the pressure supply (DV) to the storage container (VB) in the event that the suction valve (28) fails.

Partially redundant control unit (ECU) for controlling the FV valve.

Heat dissipation from PCB to the main body, and thus to the cooler spray wall, reduces the temperature of electronic components and their failure rates. 2×3-phase control of the motor, and thus redundant windings This means that very high requirements for fail operational (FO) can also be met.

In the following, further possible advantageous features are listed for the possible embodiments described above, which can be added to the embodiments in combination or individually:

For example, the pistons of the first piston-cylinder unit (main cylinder) may have different diameters and, in particular, the auxiliary piston may be dimensioned smaller for adaptation to smaller pedal forces in the fallback plane (RFE).

Likewise, one module of the two-box design (X-Boost/ESP) can be connected to a 12V battery or 12V voltage supply and the other module to a DC/DC converter or 48V vehicle electrical system or other vehicle electrical system with higher voltage, wherein in particular the X-Boost is supplied by the DC/DC converter or the 48V vehicle electrical system. To increase safety, both modules can be connected redundantly to both vehicle electrical systems, in particular a 12V battery and DC/DC converter.

The pressure supply transmission may have a self-locking trapezoidal spindle with a self-locking action in the event of drive failure.

The valve (FV) can be controlled by pulse width modulation (PWM) to generate force feedback to the brake pedal (haptic feedback with ABS).

A plug connection for the system may be located below the storage container and directed inward towards the center of the appliance to allow the associated plug to be pulled off sideways.

The second piston-cylinder unit (pressure supply DV) can be advantageously aligned parallel or perpendicular to the axis of the first piston-cylinder unit (main cylinder).

By replenishment a larger volume of brake fluid can be made available. This is advantageous in heavier vehicles or if there are air bubbles in the brake fluid, or if there are vapor bubbles in the brake fluid, which may arise as a result of overheated brakes.

Adequate function over the braking distance and driving stability if the ESP fails can be achieved by introducing isolating valves (TV1, TV2) into the brake circuits (BK1, BK2) and hydraulic multiplex operation of the pressure supply DC. Recuperation for each brake circuit individually can thus also be achieved. Further, the replenishment can also be implemented in the brake circuit 2 (BK2).

DESCRIPTION OF THE FIGURES

Further features and advantages of the invention result from the following description of embodiments examples of the invention and its designs.

The drawings show as follows:

FIG. 4: Extended X-Boost;

FIG. 4a: Redundancy in valve FV to increase functional security

FIG. 5: X-Boost with measures to increase functional security

FIG. 5a: Pedal travel sensor with measures to increase functional security

FIG. 1 shows a schematic diagram of the brake system with an actuating device, in particular brake pedal 1, a first piston-cylinder unit THZ, which can be actuated by means of the actuating device, a second piston-cylinder unit with an electromotive drive and a transmission (hereinafter also X-Boost or booster) and an ABS/ESP unit. The ABS/ESP unit is known with the main components pump P with motor M, valves HSV1 and HSV2, USV1 and USV2, inlet and outlet valves EV and AV assigned to the wheel brakes, and storage chamber (SpK). This system is described in many publications and patent applications. It is already on the market as an e-booster and is mainly used in electric and hybrid vehicles, because here the brake system is controlled in conjunction with the braking torque of the generator, i.e.

Figure 1:
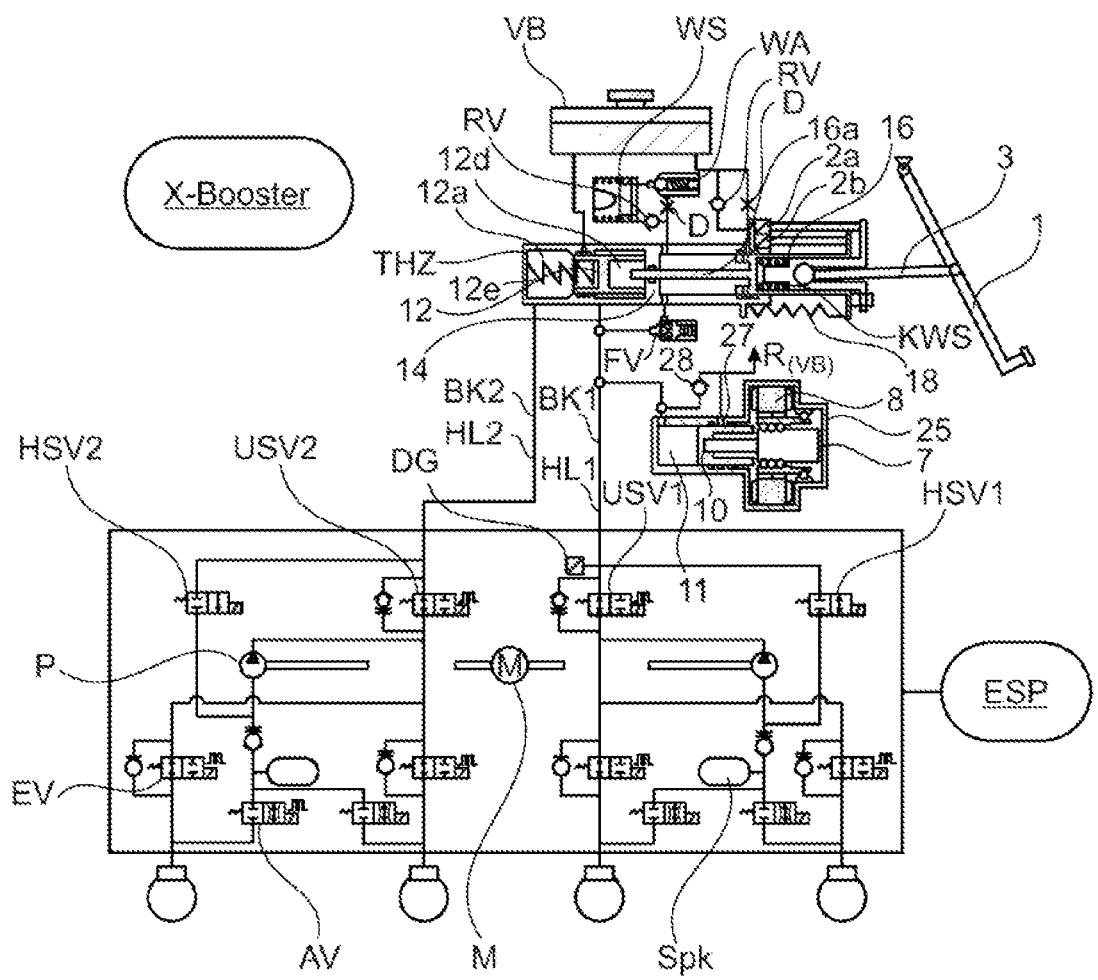
FIG. 1: Complete X-Boost system with ESP.

recuperation. As is well known, both the e-booster and the ESP elements can play a role here, especially in the pedal characteristics. Another field of application is vehicles with autonomous driving. The focus here is on error safety and redundancy of the functions, such as pressure supply and ABS function. The main difference in system design is the new X-Boost concept. This consists of a special main cylinder HZ with travel simulator WS and pressure supply DV, which is arranged parallel or perpendicular to the main cylinder HZ in order to achieve a short overall length, see also FIG. 3.

The main cylinder HZ essentially consists of an auxiliary piston (HiKo) 16 and a floating piston (SK piston) 12 with return spring 12a. The auxiliary piston 16 is connected to a plunger 16a, which acts through a partition wall 14 with seal into the pressure chamber 12d. A distance of approx. 50% of the travel of the auxiliary piston (HiKo) 16 is between the end of the plunger and the SK piston. The plunger (16a) has a significantly smaller cross-sectional area than the pistons of the first piston-cylinder unit (>factor 5 smaller) and contributes insignificantly to pressure build-up and pressure sensing in the brake circuit and transmits this force to the brake pedal, thus generating a haptic feedback to the brake pedal, especially during ABS operation and/or fading.

Normally, a valve FV is closed at the start of braking and the auxiliary piston Hiko acts on the travel simulator WS, whose function and variants are described later. The auxiliary piston Hiko has two functions: for normal operation and for a fallback level in the event of a failure of the pressure supply DV. In the first case, normal operation, it feeds the travel simulator WS with the valve FV closed, and the pedal travel is the input signal for the pressure supply DV. At the fallback level, when the pressure supply DV fails, it also feeds the travel simulator WS when the valve FV is closed, but the pedal travel is now the input signal for the ESP booster.

When brake pedal 1 is actuated with pedal plunger 3, redundant pedal travel sensors 2a/2b are activated simultaneously. These can additionally be decoupled via an elastic member KWS, as described in DE 11 2011 103274 of the applicant, to which reference is made herein this respect. Advantages are on the one hand detection when the auxiliary piston (HiKo) 16 is blocked, and on the other hand the differential travel of the sensors when the auxiliary piston (HiKo) 16 is blocked provides a control signal for auxiliary braking. The elastic member can also be part of the spring characteristic of the WS travel simulator. The auxiliary piston (HiKo) 16 has a normal breather hole of a THZ piston which is connected to the storage container VB. It is well known that a brake circuit fails if the primary seal fails. This can be avoided by using a check valve RV which is used for venting and a throttle in the connection line to VB. The throttle is dimensioned with a small flow rate so that the pedal characteristic is not significantly changed (3 mm pedal travel in 10s) if the seal fails and can still be diagnosed. The same arrangement can also be used for the floating piston (SK) 12 (not shown), which makes the failure of both seals uncritical. Alternatively, a normally open solenoid valve can also be used in the feedback line, which closes after pedal actuation or diagnosis. This applies to both pistons of the HZ (auxiliary piston HiKo and the second piston SK).

The travel simulator WS can be designed in different ways. The illustrated design corresponds to the prior art, which is described in various patent applications, consisting of a WS piston with spring combinations, which as a function of the pedal travel provide the pedal travel characteristics. The valve RV is used for the fast pressure reduction $P_{ab}$ from the travel simulator WS, if the pedal is released very fast, and the throttle D for the desired throttled pressure build-up $P_{auf}$ with the corresponding pedal characteristics. In addition, the travel simulator WS can be switched off via the valve WA. This is necessary for non-redundant systems in the fallback level (RFE) so that the intake volume of the travel simulator WS does not affect the delivery volume of the auxiliary piston Hiko to the brake circuit BK1 and pressure chamber 12d. With this system (FIG. 1) the ESP acts redundantly in case of failure of the X-Boost, where the ESP pump sucks volume from the storage container via the main cylinder THZ and the pressure supply DV. The valve WA can therefore be dispensed with. A further version is described in FIG. 1a. The auxiliary piston (HiKo) 16 with pedal plunger 16a is moved to the initial position by the pedal return spring 18 after brake actuation.

The pressure supply or DV is required for the BKV function. This consists of an EC motor 8, which moves a piston 10 via a spindle 7 and nut and delivers pressure medium into the brake circuit BK1 and the pressure chamber 12d. The dimensioning of the volume is derived from the BKV control, which controls a pressure from pedal travel 2a/2b via the BKV characteristic curve, which is measured by the pressure transducer DG in ESP. Alternatively, the motor current, measured via a shunt, can be used instead of the pressure. To improve the accuracy of the pressure control via the current measurement, this requires the recording of the friction losses in $P_{auf}$ and $P_{ab}$ in a characteristic map, optionally additionally improved by correction factors, e.g. by comparison with the vehicle deceleration. This is particularly important if the spindle drive is not a ball screw drive KGT, but a trapezoidal spindle with a plastic nut, for example.

In the starting position, the piston 10 has a breather hole 27 as in the main cylinder THZ. The volume can be sucked in via the sleeves or via a suction valve (SV) 28, which requires a lower vacuum to open and is temperature-independent.

If a trapezoidal spindle is used, the pistons remain in the position in which the motor drive no longer acts due to the self-locking of the pistons.

The dimensioning of the pressure supply DV can be staggered so that the full travel of the DV piston corresponds to the volume consumption of brake circuit BK2 or the travel of the SK piston 2. The SK piston can be designed larger in diameter and also in travel for larger volume intakes. The pressure supply DV, on the other hand, can be designed accordingly or smaller in volume (piston and travel) by making the missing volume possible by replenishing with piston return travel via the SV suction valve. For this a normally closed solenoid valve PD1 is required, which is not shown in FIG. 1 (see FIG. 1a). For full volume compensation in the event of pressure reduction $P_{ab}$, the piston must be moved to its initial position with the breather hole open. The suction valve 28 and the breather hole 27 are connected to the return line to the VB. All components of the pressure supply DV are combined in one housing 25.

The pressure build-up $P_{auf}$ and pressure reduction $P_{ab}$ in brake circuit BK1 and brake circuit BK2 is achieved via the BKV control and pedal travel sensors, and the piston of the DV moves accordingly. Normally, the X-Boost pumps volume into the brake circuit BK up to the blocking limit 80-120 bar. In the case of higher pressures, the ESP pump is activated and generates a pressure build-up to approximately 200 bar with correspondingly lower power and therefore more slowly than the pressure build-up with the X-Boost.

This is permissible because the pressure build-up to 200 bar is relevant only for fading situations and does not have to occur as quickly as the pressure build-up up to the blocking limit (e.g. for the implementation of emergency braking functions). The ESP pump is therefore set to 200 bar and the X-Boost to 80-120 bar.

If the pressure supply DV fails during a braking process, the DV piston is pushed back under pressure in brake circuit BK1 so that the brake pressure can be completely reduced. If a self-locking gear is used for the DV piston (trapezoidal spindle with plastic nut), such a pressure reduction is not possible. In this case, a normally closed solenoid valve AV is provided in brake circuit BK1 with connection to the storage container (not shown) or in connection from the breather hole of the Hiko to the storage container VB.

In the event of failure of both electronic control or regulating units (ECU) of X-Boost and ESP, which occurs very seldom, volume is conveyed in the fallback level RFE by the auxiliary piston (HiKo) 16 to the brake circuit BK1 and to the main cylinder HZ on the rear side of the SK piston through the opened valve FV and the brake pressure is increased, wherein the brake pressure in the main cylinder HZ displaces the SK piston and the pressure in brake circuit BK2 increases. To prevent this volume from escaping through the opened breather hole of the DV, a normally closed solenoid valve PD1 is provided (not shown in FIG. 1, see FIG. 1a).

Function in Case of Brake Circuit (BK) Failure

The failure of a brake circuit is detected by the pressure supply DV by comparing the p-V characteristic curve of the brake system, which is stored in a characteristic map at certain intervals as part of a diagnostic cycle. If, for example, the piston travel/volume is greater than the standard value, there is correspondingly air in the brake circuit BK or a leak. This can be identified via the p-V characteristic curve. In the event of a leak, the leak can be identified by closing the four valves EV one after the other, provided this is located outside the units, e.g. in the wheel cylinder. If this is the case, for example, in brake circuit BK1, the valves EV of brake circuit BK1 are closed. The pressure supply DV then acts via the SK piston into the brake circuit BK2 (corresponding description of the diagnostic logic in the patent applications DE 10 2015 106 089.2 and 10 2016 112 971.2, to which reference is made here in this respect). If this does not work, the pressure supply DV fails, and so does the brake booster BKV. In this case, the ESP pump acts as brake booster BKV in brake circuit BK2.

Failure of brake circuit BK2 does not result in failure of pressure supply DV, as the floating piston SK represents an important safety gate with separation of brake circuits BK1 and BK2.

In both cases, the pedal characteristics remain the same and there is no pedal through fall.

ABS Function in the Event of Pump/Motor Failure in ESP.

When the ABS pressure reduction signal $P_{ab}$ occurs, the DV control corrects the brake pressure to prevent the wheels from locking. A corresponding pressure reduction $P_{ab}$ in both brake circuits is necessary to prevent a wheel from one of the two brake circuits from locking. However, this does not mean an optimal braking effect. However, this can be improved.

For example, during wheel locking with corresponding pressure reduction $P_{ab}$ in one brake circuit, the other brake circuit cannot experience pressure reduction $P_{ab}$ by closing the valve USVs. This can be optimized with individual wheel regulation by modifying the valves EV without parallel check valve RV as described in the patent application DE 11 2009 004636 (E112) to which reference is made here).

Figure 1B:
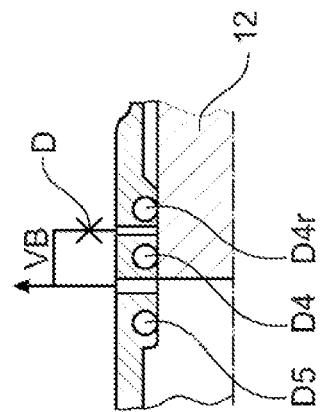
FIG. 1b: an exemplary detail embodiment of the first piston cylinder unit.
Figure 1A:
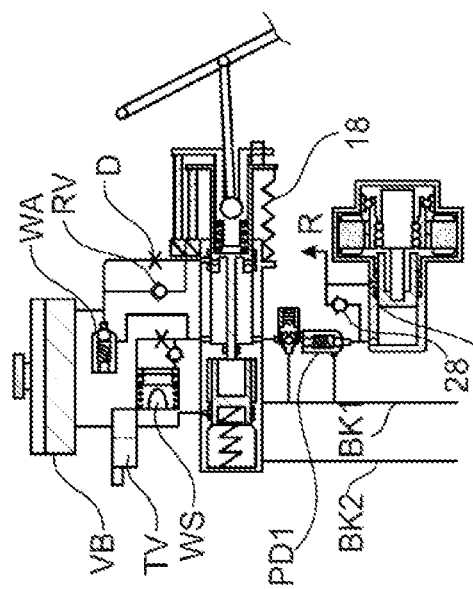
FIG. 1a: Main cylinder THZ with pressure supply DV and piston travel simulator KS.

FIG. 1a shows the main cylinder (HZ) arrangement of FIG. 1 with modifications in the travel simulator WS valve control. The travel simulator WS has the normally-closed WA valve as bypass valve. Corresponding to FIG. 2, the piston WS has the task of, in accordance with the pedal characteristic, accommodating a volume with a corresponding opposing force (pressure) on the auxiliary piston (Hiko) 16, which gives rise to costs and structural size. The pedal and WS characteristic is flat in the lower pressure range. It is expedient here to use the resetting spring 18, which accounts for approximately 40% of the volume of the WS, and the WS piston is accordingly made smaller. The valve WA is opened at the start of the braking operation. This has the result that, after a particular pedal travel after the end of area A (see FIG. 2), the valve WA is closed, in order that the more progressive part B+C is activated.

The pressure supply DV has, here, an additional normally closed solenoid valve PD1. This is necessary if the DV piston is pushed back under pressure in the fallback plane RFE and the corresponding volume is lost in the brake circuit BK1 and BK2. This may be compensated for by the large volume of the auxiliary piston HiKo, however this has a negative effect on the pedal characteristics. If the DV piston arrives in the starting position, the breather hole opens, and brake fluid flows into the storage container. In the fallback plane RFE the valve PD1 is closed. In the case of ESP interventions or ESP boost, the valve PD1 can be opened again.

In the area A (FIG. 2), it is not possible during the braking operation to establish whether the valve WA has a leak. Therefore, regular diagnosis is provided, for example at the end of the braking operation, in the case of which the pressure supply DV charges the chamber of the auxiliary piston with pressure through the opened valves PD1 and FV. The valve does not leak if, in the case of a constant position of the DV piston, the pressure does not decrease.

If the ECU of the X-Boost fails during the braking operation, then the ESP booster must take over the function of the brake boosting BKV. For this purpose, the ESP must be capable of aspirating volume from the storage container VB and releasing this back to the storage container VB after the braking operation. However, in the event of an ECU failure, the valve PD1 is closed, such that the connection between ESP and storage container VB through the breather hole of the pressure supply DV is shut off. In the case of a redundant power supply of the ECU, this failure will very seldom occur. If the ESP booster is nevertheless required, it is possible for a normally closed solenoid valve (not shown) to be provided between brake circuit BK1 and storage container VB (valve AV, see description of FIG. 1).

In one exemplary embodiment, a seal D4 is arranged in the cylinder of the floating piston SK 12.

FIG. 1b shows a further exemplary embodiment of the cylinder in which, with the floating piston SK 12, a further seal D4r is provided, as redundancy for the seal D4. If this seal fails, the brake circuit BK1 and the pressure supply DV will thus also fail. In this case the ESP unit performs the task of pressure supply, i.e. pressure increase. This can be avoided by the further seal D4r, the connection thereof to the storage container, as with the auxiliary piston (HiKo) 16, being provided with a throttle. A failure of this seal, with the low leakage flow through the throttle, will not result in a failure of the brake circuit BK1 or the pressure supply DV. In addition, a diagnosis is advantageously possible with this arrangement. Alternatively, a normally open valve TV can be provided in the connection to the storage container (FIG. 1a), which valve can be closed in the event of a leak of the seals D4 or D5.

Figure 2:
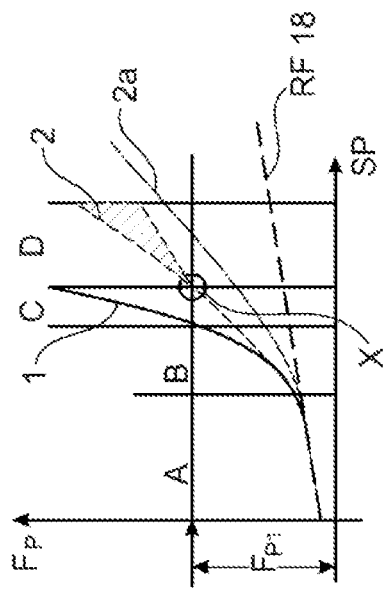
FIG. 2: Pedal characteristics.

FIG. 2 shows the pedal characteristics over the pedal travel Sp. In area A, the force increase with curve 1 is relatively flat up to approx. 30 bar brake pressure, which corresponds to approx. 85% of all braking operations. This process can also be carried out via the pedal return spring. Then the more progressive part B acts up to the blocking limit, followed by the range of higher pressures, e.g. for fading. Here the driver should also feel that there has been a change in the brake system.

Curve 1 corresponds to the X-Boost with travel simulator WS. Without WS, i.e. with follow-up booster, curve 2 results where the pedal travel depends on the venting state or fading. Accordingly, there is a scattering (not shown) to 2a, which is even more extreme in the event of brake circuit (BK) failure. With the conventional e-booster the BKV is switched from e-booster to ESP booster at x. This changes the pedal characteristics. Without influencing the BKV control, at the same pressure and pedal force, the pedal with the main cylinder (HZ) piston would deliver further volume to the ESP pump until the pressure in the wheel cylinders has reached its target values and the volume is returned to the main cylinder HZ by overflowing the valves USVs.

A changed pedal characteristic with a larger pedal travel is achieved by reducing the amplification factor of the X-Boost, which results in the outlined scatter band.

Additionally, the valves HSV1 and HSV2 can be modulated.

Here the X-Boost according to the invention with travel simulator WS behaves like curve A with corresponding progressive force increase as a function of the pedal travel.

Pedal Feedback with ABS

With the ABS function the pre-pressure supplied by the DV changes constantly. This can be felt as a small force change on the plunger 16a and thus on the connected pedal plunger 3, which is demanded by many brake specialists. This can be changed at the beginning of the ABS or intermittently during deceleration by briefly increasing the inlet pressure.

If the reaction is more noticeable, the FV valve can open and the control pressure of the DV acts directly on the auxiliary piston HiKo.

Recuperation with Travel Simulator WS

The pedal characteristic is determined by the travel simulator WS. Here, brake management with generator determines the proportion of generator braking torque (electrical braking torque) and braking pressure (hydraulic braking torque) for the required vehicle deceleration. Both quantities can be changed at will during deceleration, wherein the recuperation may apply a. the same brake pressure in all four wheel cylinders, b. axle-individual brake pressures at the vehicle axles, or c. wheel-individual brake pressures in all four wheel cylinders. Here, special control methods are necessary for the pressure supply DV, and, in the case of b. and c., possibly corresponding valve designs or corresponding valve and pump control of the ESP unit.

The calculation of the brake pressure during a recuperation in accordance with a. is preferably based on wheel force. The required total braking force (target braking force) on the wheels is determined from the pedal travel. If the target braking force can be applied electrically, then the hydraulic braking force is 0 N (braking pressure in the wheel cylinders 0 bar). If the target braking force exceeds the maximum possible electrical braking force, the difference between the target braking force and the electrical braking force is the hydraulic target braking force. The hydraulic target braking force is realized by the pressure supply DV by pressure generation in the wheel cylinders. For this purpose, the individual Cp values of the wheel brakes are used to calculate the target brake pressure, wherein the Cp value of a wheel brake represents the ratio of brake force to brake pressure. The target pressure is generated by a corresponding movement of the DV piston, wherein the pressure sensor of the ESP is used for the feedback of the piston movement. In this way, the pressure supply DV can set the target pressure both during pressure build-up and during pressure reduction. Due to the precise position control of the DV piston, the pressure setting is very accurate. The pressure control with the DV is also very quiet because no valves for $P_{auf}$ and $P_{ab}$ have to be actuated. Noise-causing valve and pump actuations of the ESP unit are not required. Furthermore, this recuperation control can be used uniformly for front, rear and all-wheel drive vehicles and X and II brake circuit splitting. The pedal characteristic remains unchanged.

In the case of b. with axle-individual brake pressures at the vehicle axles, the valves and the pump motor of the ESP might also have to be controlled. If the target brake force exceeds the maximally possible electric brake force, the difference between the target brake force and the electric brake force is thus the hydraulic target brake force, which is first applied by the pressure supply DV only at the driven axle. The EVs of the non-driven axle are closed. From a certain vehicle deceleration (for example from 0.2 g), the non-driven axle must also be hydraulically braked (due to the stability of the vehicle under braking). The hydraulic target brake force then has to be applied at the two vehicle axles jointly. The brake pressure at the non-driven axle is less than or equal to the brake pressure at the driven axle. The pressure at the driven axle is increased by the DV when the EVs are open. The pressure at the non-driven axle is adjusted by appropriate PWM control of the EVs of the non-driven axle. If the hydraulic target brake force then has to be reduced, for example because the driver releases the brake pedal, or because the generator moment increases, the brake pressures at both axles are reduced. This occurs at the driven axle with open valves EV by way of an appropriate control of the pressure supply DV. The pressure reduction at the non-driven axle occurs by opening of the valves AV (possibly clocked), together with a control of the ESP pump and pulse width modulation (PWM) control of the valves (EV) of the non-driven axle. The PWM control of the valves EV is intended to prevent the pressure at the rear axle from reducing too far. If, as a result, the pressure at the rear axle is reduced to 0 bar, the further reduction of the hydraulic target brake force then occurs exclusively via the pressure supply DV, with open valves at the driven axle and closed valves EV and AV at the driven axle. The AVs of the driven axle remain permanently closed during these processes. Valve and pump noise thus develops only above the specific vehicle deceleration (for example 0.2 g) and only at the non-driven axle.

In the case of c. with the wheel-individual brake pressures in all four cylinder, the valves and the pump motor of the ESP might also have to be controlled. The control of the pressure supply DV, of the valves, and of the ESP pump is achieved similarly to the situation described under b.

Driver Assistance Functions

There are many driver assistance functions that require automatic brake intervention, such as:

ACC (Adaptive Cruise Control) in which the desired vehicle deceleration is set by active braking intervention.

AWB (Automatic Warning Brake) where a braking impulse should wake the driver who has fallen asleep.

BDW (Brake Disc Wiping) where a very low brake pressure in the wheel cylinders should wipe the water film off the brake discs during rain so that the maximum braking effect is achieved immediately during subsequent braking.

With these assistance functions, the pressure supply DV can generate the necessary brake pressure in the wheel cylinders. The target brake pressure is specified by the various driver assistance systems. With the ACC the target brake pressure is variable and depends on the required vehicle deceleration, whereas with the BDW the target pressure has a small value (e.g. 1-3 bar). As with recuperation, the brake pressure is generated by a corresponding movement of the DV piston, wherein the pressure sensor of the ESP is also used here for the feedback of the piston movement. As with recuperation, the brake pressure setting is very accurate thanks to precise position control of the DV piston. The pressure control with the pressure supply DV is also very quiet in the driver assistance systems.

The figure description in FIG. 2, in particular, shows the decisive advantages of the invention in addition to the overall length.

Figure 3:
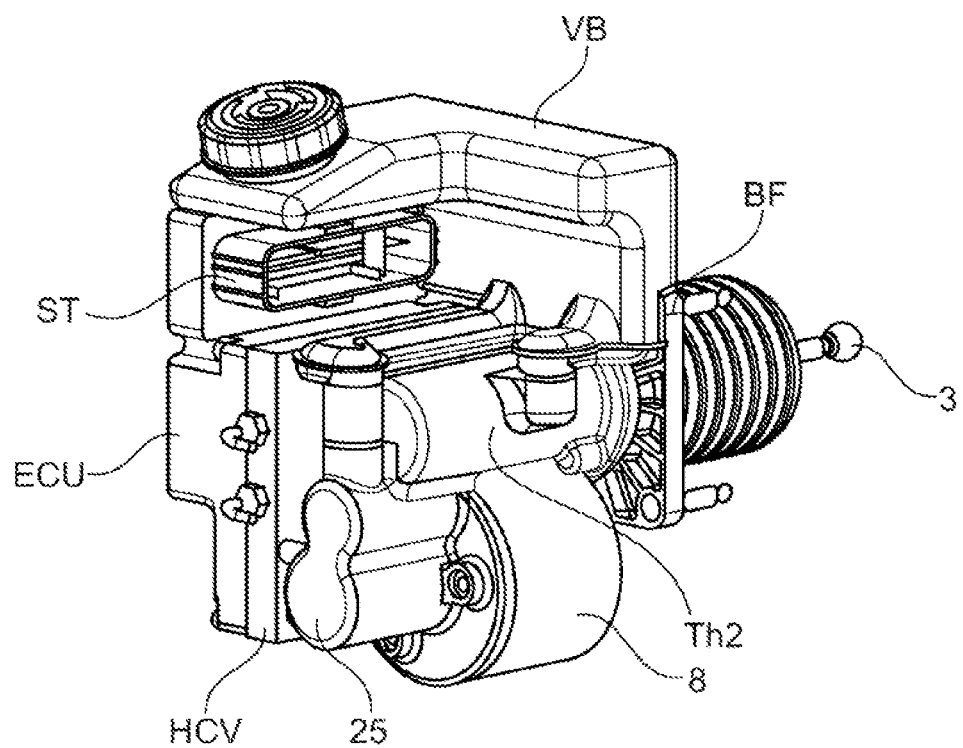
FIG. 3: Main components of the system.

FIG. 3 shows the main components of the X-Boost in a spatial representation:

Pedal plunger 3.

Mounting flange BF on the front wall

First piston-cylinder unit or main cylinder HZ with pedal interface

Motor 8 with housing pressure supply I (DV) 25, arranged advantageously parallel to the main cylinder (can also be aligned perpendicular to the axle of the HZ)

Hydraulic control and regulating unit HCU

Electronic control and regulating unit ECU

Storage container VB.

The plug connector ST is located below the storage container VB and above HZ and HCU and faces inwards towards the center of the unit to allow the associated connector to be pulled out sideways.

FIG. 4 shows an addition to FIG. 1 and FIGS. 1a and 1s based on this description. The addition is the control unit (ECU) with interface to the storage container (VB) and electrical connections e of sensors, solenoid valves and motor. The control unit (ECU) has a partially redundant partial control unit (ECU2) for actuating, for example, particularly safety-relevant components such as the FV valve with optional separate vehicle electrical system connection. This partial control unit (ECU2) in which, for example, the signals of the pedal travel sensors (2a, 2b) are used, can preferably be integrated into an existing ASIC with redundant power supply.

In the interface to the storage container (VB), the integration of the sensor element (33) into the printed circuit board (PCB) is provided with floating body (34) and with target (T) in the storage container (VB). This allows an analogous evaluation of the level of the brake fluid in the storage container (VB) which supports the diagnosis of the system. If, for example, the level has decreased after pressure has been built up by the pressure supply (DV) and subsequent pressure reduction, a leak has occurred in the system.

The printed circuit board (PCB) is advantageously mounted on an aluminum plate or aluminum carrier (37) with good heat conduction to the main body (38) and spray wall (39). At peak loads, the outside temperature at the control unit (ECU) can be 120° C. and at the spray wall (39) 60° C., as the maximum temperature in the subsequent passenger compartment (39a) is 30° C. with cooling. This allows a considerable temperature reduction to be achieved at the Mosfet (33a), whose tub is transferred to the aluminum plate (37) via so-called vias (V). As is well known, the failure rate of electronic components in particular is strongly temperature-dependent according to Arrhenius law.

The EC motor (8) can be controlled via 2×3-phase control via a redundant connection $e_{red}$ redundantly. The process is known. Usually the EC motor (8) requires an angle encoder as motor sensor (40).

As already explained in FIG. 1, for the subsequent delivery of brake fluid volume into brake circuit 1 (BK1), volume is aspirated via the suction valve (28) from the storage container (VB) by pulling back the DV piston (10). For this purpose, the valve PD1 is closed and the DV piston (10) is retracted. The DV piston (10) draws brake fluid through the suction valve (28) and the hydraulic connection (R) from the storage container (VB). When the redelivery volume is sucked into the DV chamber (10), the valve PD1 is opened and the DV piston (10) moves forward. The DV piston (10) pushes the redelivery volume into brake circuit 1 (BK1). If during the suction phase of the pressure supply (DV) the ESP return pumps (P, FIG. 1) actively increase the pressure in the wheel brake cylinders, negative pressure is generated in brake circuit 1 (BK1). The volume delivery of the ESP return pumps (P, FIG. 1) then stagnates and possibly the ESP return pump (P, FIG. 1) in brake circuit 1 (BK1) aspirates an additional volume via seal D4, the replenishing bore (47) of the main cylinder (THZ) and the hydraulic connection (48) from the storage container (VB). The SK piston (12) is pushed back by the SK piston spring (12a). The SK piston position then no longer corresponds to the pressure in the wheel brake cylinders, which can have a negative effect on the pressure reduction when the driver releases the brake pedal (1). A mini storage container (35) in brake circuit 1 (BK1) can be provided to prevent this stagnation of the volume delivery or this displacement back of the SK piston from happening. During the suction phase of the pressure supply (DV), the mini storage container (35) provides volume for the ESP return pumps (P, FIG. 1). The required volume of the mini storage container (35) depends on the duration of the suction phase and on the volume delivery capacity of the ESP return pumps (P, FIG. 1).

To increase the availability of the X-Boost and to check the function of the travel simulator (WS), a shut-off valve (36) can be provided in the hydraulic connection (44) between the replenishing bore (42) of the auxiliary piston and the storage container (VB). If, for example, the auxiliary piston seal (D2) is leaking, the shut-off valve (36) can be closed, thus avoiding a failure of the travel simulator (WS). The shut-off valve (36) can also be used to check various diagnostic functions. For this purpose, the valve PD1 is opened and the shut-off valve (36) is closed. When the pressure supply (DV) is activated, pressure is applied to brake circuit 1 (BK1), wherein the pressure can be measured, for example, with the pressure sensor (DG) of the ESP. Now, for example, the closing function of the travel simulator shut-off valve (WA) can be checked. If the valve FV is opened when the DV piston (10) is in constant position, the pressure in brake circuit 1 will drop only slightly when the travel simulator shut-off valve (WA) is functioning correctly. If the travel simulator shut-off valve (WA) is then opened, the pressure in brake circuit 1 (BK1)

will drop considerably more if the function of the travel simulator shut-off valve (WA) is intact. If there is a leak in the travel simulator shut-off valve (WA), the pressure in brake circuit 1 (BK1) will drop considerably more, even if the travel simulator shut-off valve (WA) is not yet activated, and will not drop further when the travel simulator shut-off valve (WA) is opened. If the piston seal D6 of the travel simulator piston (49) is leaking, then the pressure in brake circuit 1 (BK1) continues to drop further after opening the travel simulator shut-off valve (WA).

If the travel simulator (WS) fails, the valve FV is generally opened, e.g. if the valve FV leaks. When actuating the brake pedal (1), the driver then pushes volume from the auxiliary piston chamber (43) to the ESP return pump (P, FIG. 1) in brake circuit 1 (BK1). ESP can then apply pressure to the cylinders via the active brake function of the ESP, depending on the position of the pedal (1). The pedal travel is significantly longer than with the intact X-Boost to achieve a certain pressure in the wheel brake cylinders. This can surprise the driver and lead to unpredictable behavior. To avoid this, a hydraulic pedal reset force can be generated using the pressure supply (DV), so that the pedal force is similar to the pedal force with the X-Boost function intact. For this purpose, the pressure in brake circuit 1 (BK1), and thus also the pressure in the auxiliary piston chamber (43), is adjusted by the pressure supply (DV) so that the normal pedal force/pedal travel characteristic of the travel simulator is reproduced as intended by the vehicle manufacturer. If this reproduction succeeds well, the driver will not be surprised by a longer pedal stroke and his behavior will be more predictable. In this example, the travel simulator (WS) will function as normal, but the brake pressure build-up by the pressure supply (DV) in brake circuit 1 (BK1) can only occur after the auxiliary piston sniff hole (45) is closed, or, if the shut-off valve (36) is used, also with smaller pedal travels. When using the active braking function of the ESP, however, the pressure in the wheel brake cylinders can already be increased before the auxiliary piston breather hole (45) is closed.

FIG. 4a shows a measure to increase the functional safety of the X-Boost. The valve FV can be extended by FVred for redundancy, preferably with modified flow from the sealing ball to the valve seat.

FIG. 5 shows a redundant seal (D2.1) and a replenishing bore (50) for the auxiliary piston (16) with throttled discharge (Dr2.1) to the storage container (VB). The throttle Dr2.1 is designed so narrow that if the seal (D2) leaks, only a small leakage flow is possible from the auxiliary piston chamber (43) through the replenishing bore (50) to the storage container (VB), which, however, only results in a slow and small, non-interfering extension of the travel of the brake pedal (1) during the limited braking time. This leakage flow is detected by the pedal travel sensors (2a, 2b) in a plausibility check, but also in a system diagnosis as described in E144.

For the seals D3 and D4, redundant seals D3.1 and D4.1 with replenishing bores 51 and 52 and throttles Dr3.1 and Dr4.1 can also be used. In addition, the travel simulator seal D6 can also be redundantly equipped with seal D6.1, replenishing bore 53 and throttle Dr6.1. This means that all functionally important seals are redundant, and leaks can be detected during braking and diagnostics. This achieves a high level of safety for Fail Operational (FO). The seal arrangement can also be used with a one-circuit main cylinder (THZ) with pressure rod piston without floating circuit.

If brake circuit 1 (BK1) between ESP and the wheel cylinders of brake circuit 1 (BK1) leaks, brake circuit 1 (BK1) and the pressure supply (DV) of X-Boost fails. There is also a risk that brake fluid may be lost to the environment due to leakage. As a remedy, ESP can close both inlet valves EV of brake circuit 1 (BK1). If the fault is detected in X-Boost, but X-Boost has no access to these valves (EV), then it must be switched to the active brake function of the ESP. In this case, ESP adjusts the pressures in the wheel brake cylinders of brake circuit 2 (BK2). But for the pressure adjustment in the wheel brake cylinders of brake circuit 1 (BK1) ESP must constantly convey volume in brake circuit 1 (BK1). If ESP does not detect a leak in brake circuit 1 (BK1), brake fluid is constantly lost. For this situation the isolating valve TV1 in brake circuit 1 (BK1) between pressure chamber (12d) of the main cylinder (THZ) and ESP is provided. If X-Boost detects the leakage in brake circuit 1 (BK1), valve TV1 is closed. The pressure supply (DV) can then supply the pressure chamber (12d) of the main cylinder (THZ) and thus brake circuit 2 (BK2) with pressure without losing brake fluid.

In addition, the valve TV1 can be used to provide optimized braking distance on slippery roads in the event of ESP failure. For legal reasons it is necessary that when braking on slippery roads, the wheels on the front axle lock in front of the wheels on the rear axle. For this reason, the wheels on the rear axle are underbraked when the vehicle decelerates slightly. With X-Boost, the valve TV1 can be closed if the wheels on the front axle, on brake circuit 1 (BK1) with II brake circuit splitting, show a locking tendency. Then the brake pressure in the wheel brake cylinders at the rear axle, at brake circuit 2 (BK2), can be further increased with the pressure supply (DV) of the X-Boost until the wheels at the rear axle also show locking tendency. This means that almost maximum deceleration can be achieved for a slippery road surface. Of course it is also possible to further increase the pressure in the wheel brake cylinders on the front axle by briefly opening the valve TV1 after increasing the pressure in the wheel brake cylinders on the rear axle. With X-brake circuit splitting, valve TV1 can be closed if the front wheel of brake circuit 1 (BK1) shows a locking tendency. After valve TV1 is closed, the pressure in brake circuit 2 (BK2) can be further increased until the rear wheel of brake circuit 2 (BK2) shows a locking tendency. The pressure in brake circuit 1 (BK1) is so low that the vehicle still has sufficient stability, while the high pressure in brake circuit 2 (BK2) causes a short braking distance.

FIG. 5a shows a solution for increasing safety using the example of the pedal travel sensor (2a). If an extremely rare clamping of sensor 2a occurs when the brake pedal (1) is actuated, pedal movement is not possible and the brake fails. A pretensioned spring (41a) is provided inside the sensor (2a), the plunger (2a1) of which can be moved against the pretensioning force of the spring (41a) when the sensor (2a) is blocked. The error can be determined in a plausibility check of the signals of the two pedal travel sensors (2a, 2b) together with the elastic member (KWS). The two redundant return springs 18a and 18b acting when the brake pedal (1) is actuated replace the central return spring 18. If the sensor 2a is clamped when the brake pedal (1) is released, it may not be possible to release the brake pedal (1) completely. As a result, the vehicle would continue to be braked continuously, contrary to the driver's intention. For this situation, a notch (2a11) is provided in the plunger 2a1, which is dimensioned such that under the influence of the plunger force, the plunger breaks at the point of the notch (2a11). Of course, this solution can also be used with the pedal travel sensor 2b to increase the safety of the pedal travel sensor 2a.

Figure 5B:
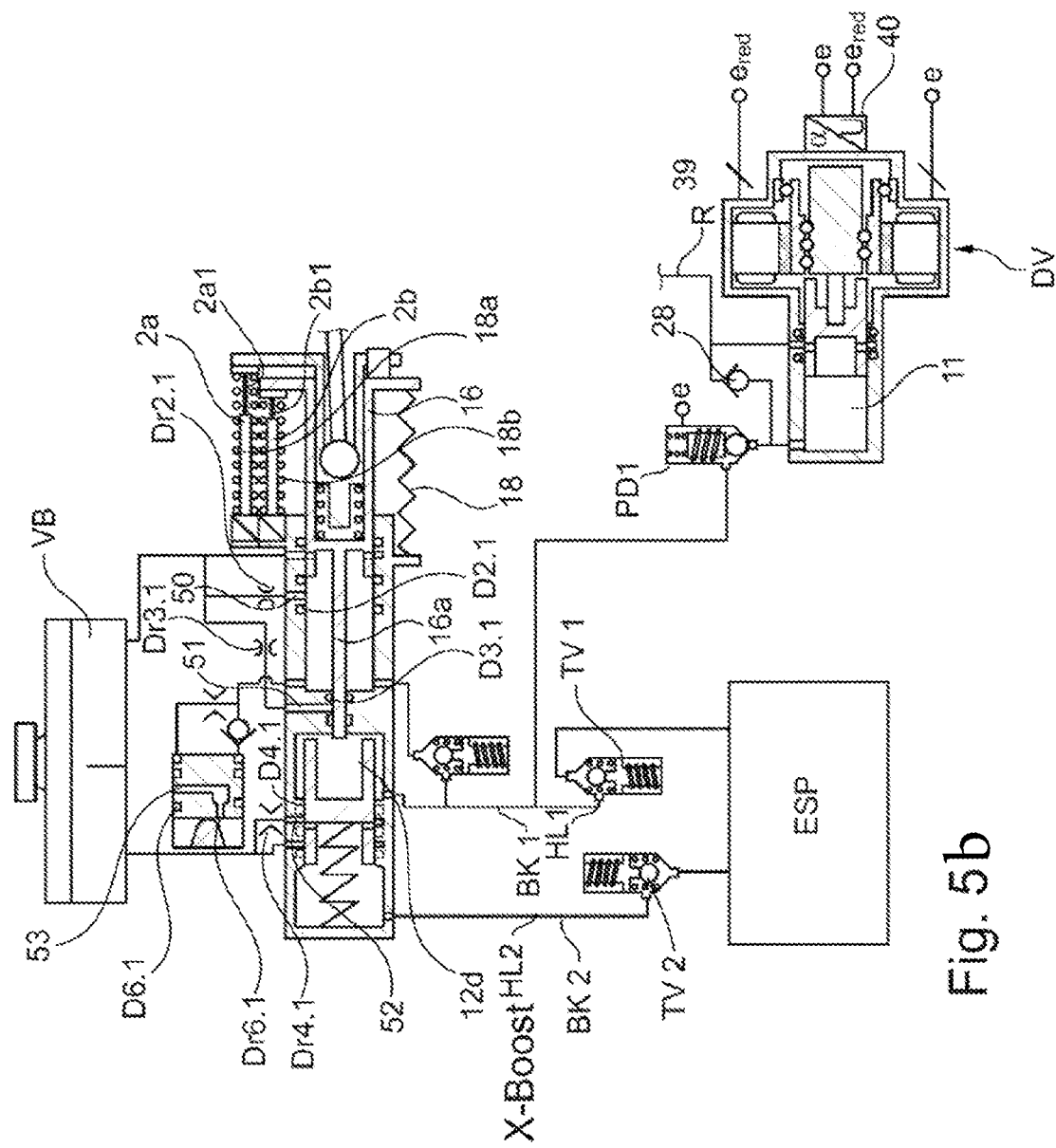
FIG. 5b: X-Boost with measures to increase functionality and functional security

FIG. 5b shows a further measure for increasing functionality and functional security of the X-Boost. In the feed line, BK2, from THZ to ESP, an isolating valve, TV2, is used in the brake circuit 2 (BK2). As with the isolating valve TV1, the hydraulic connection is important, since the output of the valve seat is connected to the ESP. These two isolating valves, TV1 and TV2, can be used for the following functions.

1. Replenishment, step 2. As already explained for FIG. 4, the volume in the brake circuit 1 (BK1), and thus the attainable pressure level in the brake circuit 1 (BK1) and brake circuit 2 (BK2) is stopped by replenishment when the SK piston (12) in the main cylinder (THZ) reaches its stop. A further pressure rise is then still possible only in the brake circuit 1 (BK1). The stop of the SK piston (12) is identifiable because the pressure in the brake circuit 1 (BK1) now increases twice as quickly with the volume increase in brake circuit 1 (BK1). If the stop of the SK piston is reached, the isolating valves, TV1 and TV2, are thus closed and the piston (10) of the pressure supply (DV) is retracted. The pressure in the brake circuit 1 (BK1) drops very quickly. Under the influence of the return spring (12a) of the SK piston (12), the SK piston (12) moves back, possibly as far as the starting position, and displaces volume from the primary chamber (12d) of the main cylinder (THZ) through the line of the brake circuit 1 (BK1) and through the valve PD1 into the chamber of the pressure supply (DV). At the same time, the SK piston (12) sucks volume from the storage container (VB) into the chamber before the SK piston (12) of the main cylinder via the seal D5 of the SK piston (12) and via the bore (47) with the hydraulic connection 48 of main cylinder (THZ) to storage container (VB). Due to the modified connection of the suction valve (28), the suction valve is not effective in the front region of the piston (10) of the pressure supply (DV), and no volume is sucked from the storage container by the suction valve (28) and the connection R as the piston (10) of the pressure supply (DV) moves back (see also description of FIG. 7). At the end of this suction process, the isolating valves TV1 and TV2 are opened again. With the subsequent forward stroke of the piston (10) of the pressure supply (DV), the SK piston (12) of the main cylinder (THZ) is advanced again, and both the pressure in the brake circuit 1 (BK1) and the pressure in the brake circuit 2 (BK2) can be further increased. The pressure supply (DV) is preferably controlled by the pressure specification of the X-Boost.

2. The isolating valves, TV1 and TV2, can also be integrated in the ESP as replacement of the switchover valves (US1, USV2), with the above-mentioned precondition of the hydraulic connection of the valve outlet to the wheel cylinder via the inlet valve (EV). This is associated with a cost and weight saving.

3. As already described, if the ESP fails, an ABS function in brake circuit 1 (BK1) can be realized with the isolating valve TV1 and the pressure supply (DV). Together with the isolating valve TV2, an ABS function can be realized both in brake circuit 1 (BK1) and in brake circuit 2 (BK2). Should each wheel of a brake circuit be ABS-controlled individually, the 4 inlet valves (EV) may thus be used. This is of great advantage in particular with a diagonal division of the brake circuit. The control processes are not shown here. The pressure control is always achieved by the pressure supply (DV).

Figure 6:
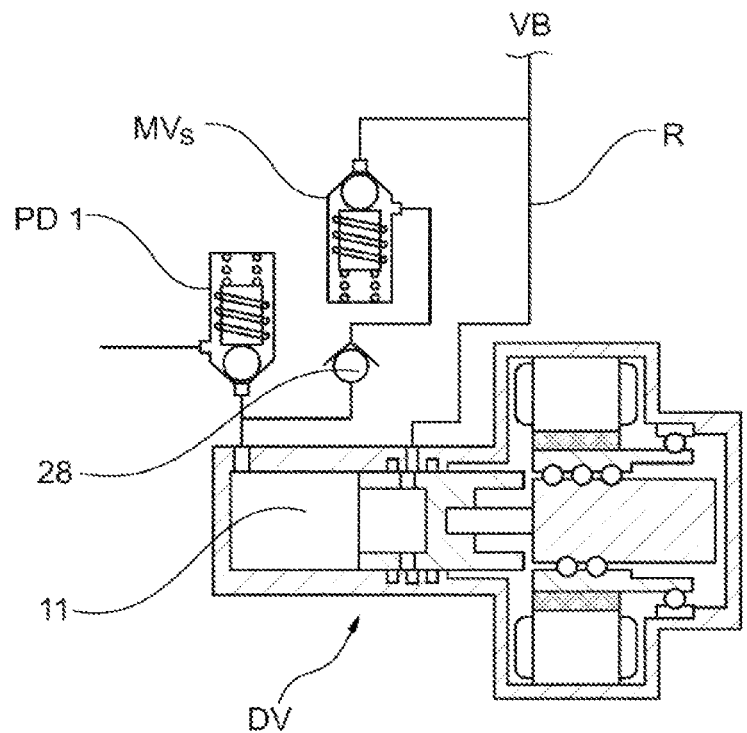
FIG. 6: Pressure supply with additional valve to increase functional security
Figure 7:
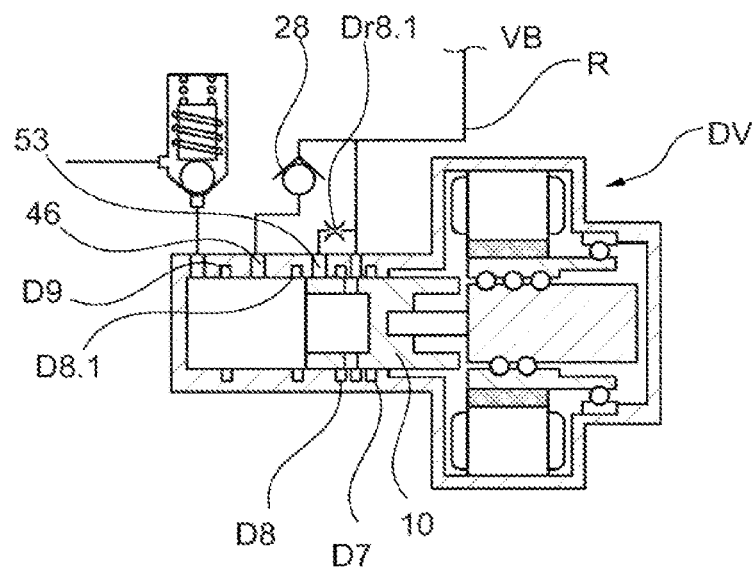
FIG. 7: Pressure supply with seal redundancy to increase functional security.

FIGS. 6 and 7 show a solution for the failure of the suction valve (28) of the pressure supply (DV), the failure of which, e.g. leakage, impairs the function of the pressure supply (DV), since the volume in the working chamber of the pressure supply (11) does not enter the brake circuit 1 (BK1) via the valve PD1, but returns to the storage container (VB) via the suction valve (28) and return line (R).

Solution 1 (FIG. 6): Use a solenoid valve (MV) as a shut-off valve in the return line (R) between the suction valve (28) and the storage container (VB). If the leakage of the suction valve (28) is detected, the solenoid valve (MV) closes. The solenoid valve (MVs) can be opened to aspirate brake fluid into the DV chamber (11) through the pressure supply (DV).

Solution 2 (FIG. 7): In an intermediate position of the DV piston (10) of the pressure supply (DV), an additional suction bore (46) and an additional seal (D9) of the DV piston (10) are provided. The additional suction bore (46) connects the DV working chamber (11) to the storage container (VB) via the suction valve (28) and the return line (R). As a result, the suction valve (28) cannot act after the intermediate position of the DV piston (10) when pressure is built up with the seal (D9) intact. The failure of the suction valve (28) then has no influence on the pressure build-up function of the pressure supply (DV). When the DV piston (10) is moved back to the intermediate position, the DV piston (10) can only draw volume from the storage container (VB) via the sleeve (D9), the suction bore (46), the suction valve (28) and the return line (R), but with two pressure losses (the seal, D9, and the suction valve, 28). Only before the intermediate position of the DV piston (10) does only the suction valve (28) work again. Since the suction function only works during subsequent conveying, no further disadvantages can be detected. Additional conveying is necessary if additional volume is required for a higher pressure level or to compensate for poor ventilation.

Similar to the seal D4 of the main cylinder (THZ), a redundant seal D8.1 with a breather bore (53) and throttle Dr8.1 can also be used for the piston seal D8. Thus the pressure supply (DV) would also satisfy the requirements of the "Fail Operational" (FO).

It follows from the above description that the measures described in detail will lead to further modifications of the brake system according to the invention, which also belong to the claimed scope of the invention.

Figure 8:
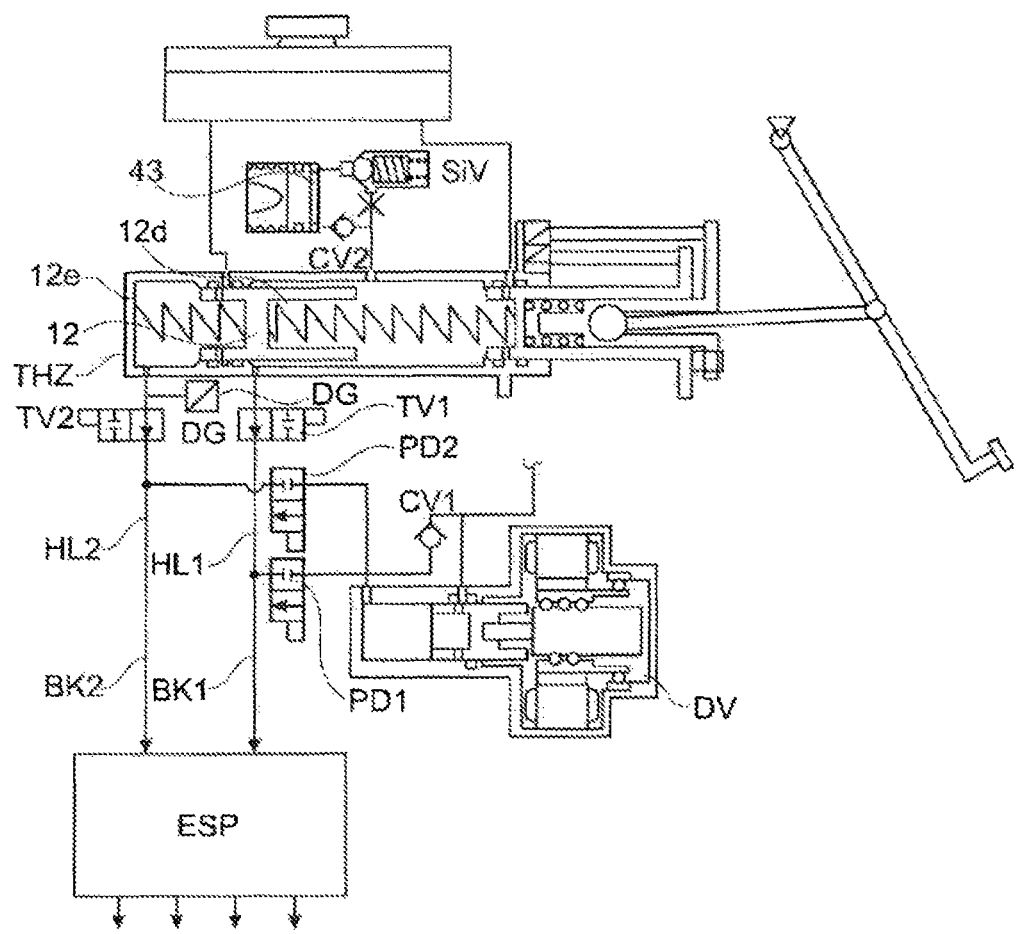
FIG. 8: Brake system with THZ, pressure supply device and ESP unit.

FIG. 8 shows a brake system with a main cylinder THZ, a pressure supply device DV and an ESP unit ESP. By means of the isolating valves TV1 and TV2 (normally-open normal position), the main cylinder THZ can be separated from the brake circuits, such that a pressure change in the brake circuits BK1 and/or BK2 can be performed by means of the pressure supply device DV in the case of the valves PD1 and/or PD2 (normally-closed normal position) being respectively open. The pressure transducer DG serves for determining the pressure in the brake circuit BK2.

Figure 9:
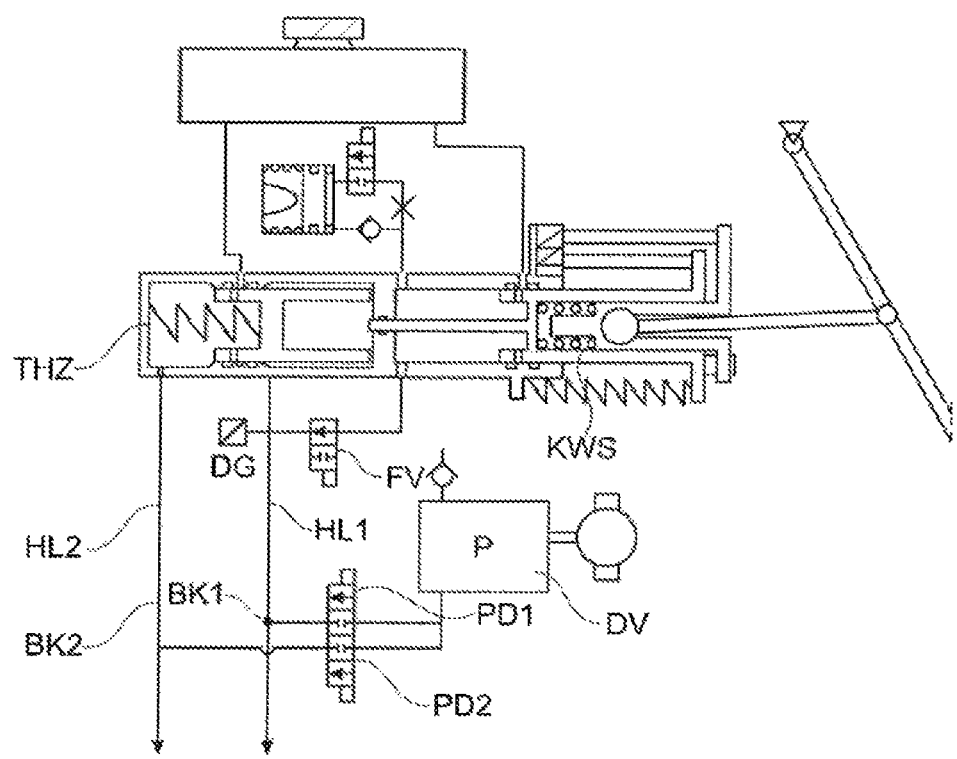
FIG. 9: Brake system with pressure supply device, the pressure chamber of which can optionally be connected to one of the brake circuits for axle-by-axle ABS function via switching valves.

FIG. 9 shows a brake system with a pressure supply device DV, the pressure chamber of which is connectable by means of the two valves PD1 and PD2 selectively to one of the brake circuits BK1 and BK2 for axle-by-axle ABS function. Via the valve FV, the pressure in the brake circuit BK1 can be conducted into the pressure chamber 43, such that a feedback force is exerted on the brake pedal, such that a brake feel is imparted to the person performing the braking operation.

LIST OF REFERENCE NUMERALS

1 Brake pedal
2a Master pedal travel sensors
2a1 Plunger of the pedal travel sensor 2a
2a11 Notch in plunger 2a1 of pedal travel sensor 2a
2b Slave pedal travel sensors
2b1 Pedal travel sensor plunger 2b
3 Pedal plunger
7 Spindle (KGT), trapezoidal spindle
8 EC motor
10 Piston (DV)
11 Pressure chamber or working chamber of the DV
12 SK piston
12a Return spring SK piston
12d Pressure chamber or working chamber on floating piston SK (rear)
14 Partition wall
16 Auxiliary piston
16a Plunger
18 Pedal return spring
18a Pedal return spring for pedal travel sensor 2a
18b Pedal return spring for pedal travel sensor 2b
25 DV housing
27 Breather hole
28 Suction valve
28a Return spring
28c Valve disk
28b T-plunger of the valve disk
30 Armature
31 Coil
32 Solenoid
33 Sensor element
33a Component, e.g. MOSFET
34 Floating body
35 Mini storage container
36 Shut-off valve for storage container (VB)
37 Aluminum plate or support
38 Main body
39 Spray wall
39a Passenger compartment
40 Motor sensor
41a Preloaded spring on pedal travel sensor 2a
41b Preloaded spring on pedal travel sensor 2b
42 Replenishing bore of the auxiliary piston (16)
43 Chamber of the auxiliary piston (16)
44 Hydraulic connection
45 Breather hole of the auxiliary piston (16)
46 Suction bore in the pressure supply (DV)
47 Replenishing bore of the main cylinder (THZ)
48 Hydraulic connection
49 Piston of the travel simulator (WS)
50 Replenishing bore of the auxiliary piston (16)
51 Replenishing bore of the auxiliary piston plunger (16a)
52 Replenishing bore of the main cylinder (THZ)
53 Replenishing bore of the pressure supply (DV)
AV Outlet valve ABS
B1 Vehicle electrical system connection 1
B2 Vehicle electrical system connection 2
BF Mounting flange for end wall
BK Brake circuit
BK1 Brake circuit 1
BK2 Brake circuit 2
D Orifice for throttling
DV Pressure supply
DG Pressure transducer
Dr 2.1-Dr 6.1, Dr8.1 Throttles in the return flow to the storage container (VB)
D1 Seal 1 of the auxiliary piston (16)
D2 Seal 2 of the auxiliary piston (16)
D2.1 Redundant seal (D2)
D3 Seal of the auxiliary piston plunger (16a)
D3.1 Redundant seal (D3)
D4 Seal 4 of SK piston (12)
D4.1 Redundant seal (D4)
D5 Seal 5 of SK piston (12)
D6 Seal 6 of the travel simulator piston (49)
D6.1 Redundant seal (D6)
D7 Seal 7 of DV piston (10)
D8 Seal 8 of DV piston (19)
D8.1 Redundant seal (D8)
D9 Additional seal of the DV piston (10)
e Electrical connection
$e_{red}$ Redundant electrical connection
ECU Control unit of X-Boost (Electronic Control Unit)
ECU2 Partially redundant controller of X-Boost
EV Inlet valve ABS
FO Fail operational
FV Isolating valve, normally open
HZ Main cylinder
KGT Ball screw drive (spindle)
KWS Force-displacement sensor
MVS Shut-off valve, normally closed
PCB Printed circuit board
PD1 Switching valve, in particular solenoid valve (normally closed) to the DV working chamber
PD2 Switching valve, in particular solenoid valve (normally closed) to the DV working chamber
R Return to storage container VB
R Return line to storage container VB
RV Check valve at the breather hole of auxiliary piston
ST Plug connector
SV Suction valve
T Target
THZ (Tandem) main cylinder
TTL Time to lock
TV1 Isolating valve, normally open, in brake circuit 1 (BK1)
TV2 Isolating valve, normally open, in brake circuit 2 (BK2)
TV Solenoid valve (normally open) to storage container (VB)
V Vias
VB Storage container
WA Solenoid valve (normally closed)
WS Travel simulator

The invention claimed is:
1. A brake system for a vehicle, comprising:
an actuating device,
a first piston-cylinder unit, enabled to be actuated by means of the actuating device, and arranged to supply pressure medium to one or more brake circuits via a first valve device,
wherein the first piston-cylinder unit has a floating piston which separates a first working chamber and a second working chamber from one another,
a second piston-cylinder unit comprising a pressure chamber, an electromotive drive and a transmission, wherein the electromotive drive is arranged to drive a piston for supplying pressure medium to at least one of the one or more brake circuits via a second valve device, and a motor-pump unit with a third valve device, configured to supply pressure medium to the one or more brake circuits, wherein, by means of a control device, the motor of the electromotive drive of the second piston-cylinder unit and the motor of the motor-pump unit are enabled to be used, wherein the motor-pump unit is connected via two hydraulic connections to the first working chamber and to the second working chamber, wherein an isolating valve is arranged only in one of the two hydraulic connections, or wherein a respective isolating valve is arranged in each of the two hydraulic connections for the purposes of selectively opening or closing the respective hydraulic connection, wherein the second piston-cylinder unit is connected to the respective hydraulic connections via respective valves to enable a pressure change to be performed in at least one of the one or more brake circuits, wherein the second piston-cylinder unit is only effective in a specific pressure range, and wherein the motor-pump unit is used for pressure generation for a further pressure range that is higher than the specific pressure range, and wherein control of the second piston-cylinder unit takes place via pedal travel and pressure by means of a corresponding brake booster characteristic curve, wherein motor current is used to control the second piston-cylinder unit.

2. The brake system according to claim 1, wherein a hydraulic travel simulator is connectable to a working chamber of the first piston-cylinder unit via a normally-closed solenoid valve and a check valve or via a throttle and a check valve.

3. The brake system according to claim 2, wherein the first piston-cylinder unit has the first and second working chambers and a third working chamber, which is connectable by means of a switchable valve to the second working chamber, wherein an auxiliary piston delimits the third working chamber, wherein the auxiliary piston is a constituent part of the hydraulic travel simulator.

4. The brake system according to claim 1, wherein the second piston-cylinder unit is connectable to at least one of the switchable valves of the one or more brake circuits for the supply of pressure thereto and for the purposes of changing pressure an anti-lock braking system (ABS) function in the one or more brake circuits via the respective valve.

5. The brake system according to claim 1, wherein, in the event of failure of pressure supply of the motor-pump unit, an anti-lock braking system (ABS) function is carried out using the second piston-cylinder unit, together with pressure regulating valves of the motor-pump unit.

6. The brake system according to claim 1, wherein a cylinder of the floating piston of the first piston-cylinder unit has a first passage, wherein the cylinder is provided with two seals, of a line leading to a storage container, and a second passage which is provided with a further seal, and which is connected via a throttle to the line leading to the storage container.

7. The brake system according to claim 1, wherein, parallel to at least one piston seal of the first piston-cylinder unit, a redundant seal is arranged, wherein, between the at least one piston seal and the redundant seal, a hydraulic passage opens into the cylinder, which passage is arranged in a cylinder wall of the first piston-cylinder unit and connects a cylinder interior of the first piston-cylinder unit, directly or via a hydraulic line connected thereto, to a storage container, wherein a throttle is arranged in the hydraulic passage or the hydraulic line.

8. The brake system according to claim 2, wherein, parallel to a piston seal of a piston-cylinder unit of the travel simulator, a redundant seal is arranged.

9. The brake system according to claim 1, further comprising a level sensor arranged or integrated in or on printed circuit board, wherein a linear evaluation of liquid level in a pressure medium storage container for early detection of leaks takes place by means of the level sensor.

10. The brake system according to claim 3, wherein a redundant separating valve is arranged in series with the switchable valve in a hydraulic line in such a way that the hydraulic line is enabled to be selectively shut off by one of the two valves.

11. The brake system according to claim 1, wherein the second piston-cylinder unit includes at least one piston seal and a redundant piston seal arranged in parallel to the at least one piston seal, wherein, between the at least one piston seal and the redundant piston seal, a hydraulic passage opens into the cylinder of the second piston-cylinder unit, wherein the hydraulic passage is arranged in a wall of the cylinder and connects the interior of the second piston-cylinder unit directly or via a hydraulic line connected thereto to a storage container, wherein a throttle is arranged in the hydraulic passage or the hydraulic line.

12. The brake system according to claim 11, wherein the second piston-cylinder unit further includes an additional seal arranged in a region of an intermediate position of the piston of the second piston-cylinder unit, wherein the additional seal is configured to secure function of the second piston-cylinder unit in an event of leakage of a suction valve disposed in a hydraulic line disposed between a storage container and a working chamber of the second piston-cylinder unit.

13. The brake system according to claim 4, wherein in an event of failure of the motor-pump unit during the ABS function a required pressure is adjusted to or set using the second piston-cylinder unit and the isolating valve(s) in a multiplex process.

14. The brake system according to claim 1, wherein the brake system is configured to individually vary a brake pressure for a vehicle axle depending on a generator braking effect and a total braking effect required.

15. The brake system according to claim 3, wherein a cylinder of the auxiliary piston of the first piston-cylinder unit has a passage between two seals, wherein a hydraulic line leads from the passage to a storage container, and wherein a throttle is arranged in the hydraulic line.

16. The brake system according to claim 1, further comprising a linear level transmitter for brake fluid provided in a storage container, wherein the linear level transmitter is configured to detect small volume changes in the storage container and to provide an early warning in an event of a leak in the brake system.

17. A method of braking a vehicle on a slippery road surface using the brake system according to claim 1, wherein the hydraulic connections are coupled to respective ones of the one or more brake circuits, wherein the method comprises:
operating the isolating valve in a first one of the two hydraulic connections coupled to a first one of the one or more brake circuits to prevent locking of wheels of a front axle of the vehicle; or
in an event of failure of an electronic stability program (ESP) system of the brake system, operating the isolating valve in a second one of the two hydraulic connections coupled to a second one of the one or more brake circuits to prevent locking of wheels of a rear axle of the vehicle.

18. A method of braking a vehicle having wheel brakes and incorporating the brake system according to claim 1, the method comprising:
setting one or more required pressures in the wheel brakes using a multiplex process by using the second piston-cylinder unit and by correspondingly controlling the two isolating valves in the respective hydraulic connections, in the event of failure of the motor-pump unit.

19. A method of braking using the brake system according to claim 1, the method comprising:
performing an ABS operation in an event of a failure of the pressure medium supply by the motor-pump unit, wherein the ABS function is performed using the second piston-cylinder unit together with pressure regulating valves of the motor-pump unit.

20. A method of braking using the brake system according to claim 1, the method comprising:
performing an axle-individual or wheel-individual recuperation by performing pressure build-up and pressure reduction by the second piston-cylinder unit and controlling valves of the motor-pump unit, wherein a target brake pressure is set by the second piston-cylinder unit, wherein when a target braking force is greater than a maximum electrical braking force, the target braking force of an axle or of a wheel cylinder is a difference between the target braking force and the electrical braking force and the target brake pressure is calculated from the target braking force.

21. A method of braking a vehicle incorporating a brake system in an X brake circuit splitting configuration, the brake system comprising:
an actuating device,
a first piston-cylinder unit, enabled to be actuated by means of the actuating device, and arranged to supply pressure medium to one or more brake circuits via a first valve device,
wherein the first piston-cylinder unit has a floating piston which separates a first working chamber and a second working chamber from one another,
a second piston-cylinder unit comprising a pressure chamber, an electromotive drive and a transmission, wherein the electromotive drive is arranged to drive a piston for supplying pressure medium to at least one of the one or more brake circuits via a second valve device, and
a motor-pump unit with a third valve device, configured to supply pressure medium to the one or more brake circuits,
wherein, by means of a control device, the motor of the electromotive drive of the second piston-cylinder unit and the motor of the motor-pump unit are enabled to be used,
wherein the motor-pump unit is connected via two hydraulic connections to the first working chamber and to the second working chamber,
wherein an isolating valve is arranged only in one of the two hydraulic connections, or wherein a respective isolating valve is arranged in each of the two hydraulic connections for the purposes of selectively opening or closing the respective hydraulic connection,
wherein the second piston-cylinder unit is connected to the respective hydraulic connections via respective valves to enable a pressure change to be performed in at least one of the one or more brake circuits,
wherein the second piston-cylinder unit is only effective in a specific pressure range, and
wherein the motor-pump unit is used for pressure generation for a further pressure range that is higher than the specific pressure range,
the method comprising:
closing the isolating valve in the one of the two hydraulic connections corresponding to a first brake circuit of the one or more brake circuits when a front wheel of the first brake circuit shows a tendency to lock, wherein the one or more brake circuits include first and second brake circuits, and
increasing pressure in the second brake circuit of the one or more brake circuits, following said closing the isolating valve, until a rear wheel of the second brake circuit shows a tendency to lock.

22. A method of braking a vehicle incorporating a brake system in an II brake circuit splitting configuration, the vehicle further having front and rear axles having respective wheels, and wherein the one or more brake circuits include a first brake circuit and a second brake circuit, wherein the brake system comprises:
an actuating device,
a first piston-cylinder unit, enabled to be actuated by means of the actuating device, and arranged to supply pressure medium to one or more brake circuits via a first valve device,
wherein the first piston-cylinder unit has a floating piston which separates a first working chamber and a second working chamber from one another,
a second piston-cylinder unit comprising a pressure chamber, an electromotive drive and a transmission, wherein the electromotive drive is arranged to drive a piston for supplying pressure medium to at least one of the one or more brake circuits via a second valve device, and
a motor-pump unit with a third valve device, configured to supply pressure medium to the one or more brake circuits,
wherein, by means of a control device, the motor of the electromotive drive of the second piston-cylinder unit and the motor of the motor-pump unit are enabled to be used,
wherein the motor-pump unit is connected via two hydraulic connections to the first working chamber and to the second working chamber,
wherein an isolating valve is arranged only in one of the two hydraulic connections, or
wherein a respective isolating valve is arranged in each of the two hydraulic connections for the purposes of selectively opening or closing the respective hydraulic connection,
wherein the second piston-cylinder unit is connected to the respective hydraulic connections via respective valves to enable a pressure change to be performed in at least one of the one or more brake circuits,
wherein the second piston-cylinder unit is only effective in a specific pressure range, and
wherein the motor-pump unit is used for pressure generation for a further pressure range that is higher than the specific pressure range,
the method comprising:
(a) closing the isolating valve in the one of the two hydraulic connections corresponding to the first brake circuit when the wheels on the front axle of the vehicle, which are assigned to the first brake circuit, show a tendency to lock, and operating the second piston-cylinder unit to increase brake pressure in wheel brake cylinders on the rear axle of the vehicle, which are assigned to the second brake circuit, until the wheels on the rear axle also show a tendency to lock; or (b) closing the isolating valve in the one of the two hydraulic connections corresponding to the second brake circuit when the wheels on the rear axle show a tendency to lock; and operating the second piston-cylinder unit to increase brake pressure in wheel brake cylinders on the front axle, which are assigned to the first brake circuit, until the wheels on the front axle also show a tendency to lock.

23. The method of braking according to claim 22, wherein the method further comprises: (a) increasing the pressure in wheel brake cylinders on the front axles by opening the isolating valve in the one of the two hydraulic connections corresponding to the first brake circuit after the pressure increase in the wheel brake cylinders on the rear axle; or (b) increasing the pressure in wheel brake cylinders on the rear axle by opening the isolating valve in the one of the two hydraulic connections corresponding to the second brake circuit after the pressure increase in the wheel brake cylinders on the front axle.

24. A method of braking a vehicle incorporating a brake system in an X brake circuit splitting configuration, wherein the brake system comprises:
an actuating device,
a first piston-cylinder unit, enabled to be actuated by means of the actuating device, and arranged to supply pressure medium to one or more brake circuits via a first valve device,
wherein the first piston-cylinder unit has a floating piston which separates a first working chamber and a second working chamber from one another,
a second piston-cylinder unit comprising a pressure chamber, an electromotive drive and a transmission, wherein the electromotive drive is arranged to drive a piston for supplying pressure medium to at least one of the one or more brake circuits via a second valve device, and
a motor-pump unit with a third valve device, configured to supply pressure medium to the one or more brake circuits,
wherein, by means of a control device, the motor of the electromotive drive of the second piston-cylinder unit and the motor of the motor-pump unit are enabled to be used,
wherein the motor-pump unit is connected via two hydraulic connections to the first working chamber and to the second working chamber,
wherein an isolating valve is arranged only in one of the two hydraulic connections, or wherein a respective isolating valve is arranged in each of the two hydraulic connections for the purposes of selectively opening or closing the respective hydraulic connection,
wherein the second piston-cylinder unit is connected to the respective hydraulic connections via respective valves to enable a pressure change to be performed in at least one of the one or more brake circuits,
wherein the second piston-cylinder unit is only effective in a specific pressure range, and
wherein the motor-pump unit is used for pressure generation for a further pressure range that is higher than the specific pressure range, and
wherein the one or more brake circuits consist of first and second brake circuits, each of the first and second brake circuits being associated with a respective front wheel and a respective rear wheel of the vehicle,
the method comprising:
closing the isolating valve in the one of the two hydraulic connections corresponding to the first brake circuit when the front wheel of the first brake circuit shows a tendency to lock, and
increasing pressure in the second brake circuit while said isolating valve is closed until the rear wheel of the second brake circuit shows a tendency to lock.

25. A method of braking a vehicle incorporating a brake system in an X brake circuit splitting configuration, the brake system comprising:
an actuating device,
a first piston-cylinder unit, enabled to be actuated by means of the actuating device, and
arranged to supply pressure medium to one or more brake circuits via a first valve device,
wherein the first piston-cylinder unit has a floating piston which separates a first working chamber and a second working chamber from one another,
a second piston-cylinder unit comprising a pressure chamber, an electromotive drive and a transmission, wherein the electromotive drive is arranged to drive a piston for supplying pressure medium to at least one of the one or more brake circuits via a second valve device, and
a motor-pump unit with a third valve device, configured to supply pressure medium to the one or more brake circuits,
wherein, by means of a control device, the motor of the electromotive drive of the second piston-cylinder unit and the motor of the motor-pump unit are enabled to be used,
wherein the motor-pump unit is connected via two hydraulic connections to the first working chamber and to the second working chamber,
wherein an isolating valve is arranged only in one of the two hydraulic connections, or wherein a respective isolating valve is arranged in each of the two hydraulic connections for the purposes of selectively opening or closing the respective hydraulic connection,
wherein the second piston-cylinder unit is connected to the respective hydraulic connections via respective valves to enable a pressure change to be performed in at least one of the one or more brake circuits,
wherein the second piston-cylinder unit is only effective in a specific pressure range, and
wherein the motor-pump unit is used for pressure generation for a further pressure range that is higher than the specific pressure range, and
wherein the one or more brake circuits consist of first and second brake circuits, each of the first and second brake circuits being associated with a respective front wheel and a respective rear wheel of the vehicle,
the method comprising:
closing the isolating valve in the one of the two hydraulic connections corresponding to the second brake circuit when the front wheel of the second brake circuit shows a tendency to lock, and
increasing pressure in the first brake circuit while said isolating valve is closed until the rear wheel of the first brake circuit shows a tendency to lock.

26. A method of braking using a brake system wherein the brake system comprises:
an actuating device,
a first piston-cylinder unit, enabled to be actuated by means of the actuating device, and arranged to supply pressure medium to one or more brake circuits via a first valve device, wherein the first piston-cylinder unit has a floating piston which separates a first working chamber and a second working chamber from one another, a second piston-cylinder unit comprising a pressure chamber, an electromotive drive and a transmission, wherein the electromotive drive is arranged to drive a piston for supplying pressure medium to at least one of the one or more brake circuits via a second valve device, and a motor-pump unit with a third valve device, configured to supply pressure medium to the one or more brake circuits, wherein, by means of a control device, the motor of the electromotive drive of the second piston-cylinder unit and the motor of the motor-pump unit are enabled to be used, wherein the motor-pump unit is connected via two hydraulic connections to the first working chamber and to the second working chamber, wherein an isolating valve is arranged only in one of the two hydraulic connections, or wherein a respective isolating valve is arranged in each of the two hydraulic connections for the purposes of selectively opening or closing the respective hydraulic connection, wherein the second piston-cylinder unit is connected to the respective hydraulic connections via respective valves to enable a pressure change to be performed in at least one of the one or more brake circuits, wherein the second piston-cylinder unit is only effective in a specific pressure range, and wherein the motor-pump unit is used for pressure generation for a further pressure range that is higher than the specific pressure range, and wherein the brake system includes four wheel brake cylinders, the method comprising:

performing a recuperation with a same brake pressure in all four wheel brake cylinders by building up pressure and reducing pressure by the second piston-cylinder unit, wherein a target brake pressure is set by the second piston-cylinder unit, wherein when a target braking force is greater than a maximum electrical braking force, the target braking force is a difference between the target braking force and the electrical braking force and the target brake pressure is calculated from the target braking force using individual Cp values, which are ratios of brake force to brake pressure, of the wheel brakes, and wherein when the target braking force is less than or equal to the maximum electrical braking force, a hydraulic braking force has 0 N, such that braking is performed exclusively electrically.

* * * * *